US012219457B2

(12) United States Patent
Ding

(10) Patent No.: US 12,219,457 B2
(45) Date of Patent: Feb. 4, 2025

(54) COMMUNICATION METHOD, APPARATUS, AND SYSTEM

(71) Applicant: HUAWEI TECHNOLOGIES CO., LTD., Guangdong (CN)

(72) Inventor: Hui Ding, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 452 days.

(21) Appl. No.: 17/683,433

(22) Filed: Mar. 1, 2022

(65) Prior Publication Data
US 2022/0191765 A1    Jun. 16, 2022

Related U.S. Application Data

(63) Continuation of application No. PCT/CN2020/086805, filed on Apr. 24, 2020.

(30) Foreign Application Priority Data

Sep. 2, 2019  (CN) .......................... 201910822115.1

(51) Int. Cl.
H04W 40/24         (2009.01)
(52) U.S. Cl.
CPC ................................. *H04W 40/248* (2013.01)
(58) Field of Classification Search
CPC ... H04W 40/248; H04W 28/24; H04W 48/16; H04W 28/06; H04W 40/02; H04L 45/14; H04M 15/66
See application file for complete search history.

(56) References Cited

U.S. PATENT DOCUMENTS

| 10,701,587 B2* | 6/2020 | Chaponniere ......... H04L 1/0072 |
| 2019/0053104 A1* | 2/2019 | Qiao ..................... H04W 28/24 |

(Continued)

FOREIGN PATENT DOCUMENTS

| CN | 108811000 A | 11/2018 |
| CN | 109155949 A | 1/2019 |
| CN | 109315004 A | 2/2019 |
| CN | 109460660 A | 3/2019 |
| CN | 109756423 A | 5/2019 |
| CN | 109792652 A | 5/2019 |
| CN | 109818769 A | 5/2019 |
| CN | 109922472 A | 6/2019 |

(Continued)

OTHER PUBLICATIONS

Motorola Mobility et al., "Efficient delivery of UE Policies", SA WG2 Meeting #S2-129 S2-1811412, Oct. 15-Oct. 19—P.R. China, total 7 pages. (Year: 2018).*

(Continued)

*Primary Examiner* — Ayaz R Sheikh
*Assistant Examiner* — Louis Samara

(57) ABSTRACT

In a communication method, a policy control network element receives first information from a terminal device, where the first information is a banned application identifier, a banned PSI, a URSP identifier, or an allowed application identifier. The policy control network element obtains a first URSP of the terminal device from a data storage network element. The policy control network element determines a second URSP of the terminal device based on the first information and the first URSP. Based on this solution, when deciding a URSP of the terminal device, the policy control network element considers the first information reported by the terminal device, so that a proper URSP can be determined for the terminal device. In addition, this helps avoid signaling overheads caused because the terminal device and a policy control network element side continuously update and maintain a URSP that the terminal device does not need to use.

9 Claims, 10 Drawing Sheets

(56) References Cited

U.S. PATENT DOCUMENTS

| | | | | |
|---|---|---|---|---|
| 2019/0268835 A1* | 8/2019 | Shan | | H04W 48/16 |
| 2022/0272031 A1* | 8/2022 | Miklós | | H04W 40/02 |

FOREIGN PATENT DOCUMENTS

| | | | | | |
|---|---|---|---|---|---|
| CN | 109982391 | A | | 7/2019 | |
| CN | 110049070 | A | | 7/2019 | |
| CN | 110049485 | A | | 7/2019 | |
| CN | 110177368 | A | | 8/2019 | |
| CN | 111770507 | A | * | 10/2020 | ............ H04L 67/14 |
| CN | 111835638 | A | * | 10/2020 | ............ H04L 45/14 |
| CN | 115669185 | A | * | 1/2023 | |
| KR | 20210030468 | A | * | 3/2021 | |
| WO | WO-2019137553 | A1 | * | 7/2019 | ............ H04M 15/66 |
| WO | 2019158218 | A1 | | 8/2019 | |
| WO | 2019158778 | A1 | | 8/2019 | |
| WO | 2019159567 | A1 | | 8/2019 | |
| WO | WO-2020034927 | A1 | * | 2/2020 | ............ H04W 24/02 |
| WO | WO-2024088195 | A1 | * | 5/2024 | |

OTHER PUBLICATIONS

ZTE, "Optimal policy control support for PDU session establishment", SA WG2 Meeting #132 S2-1903692, Apr. 7-12, 2019, Xian, China, total 16 pages.

Notice of Allowance dated Jan. 5, 2023 issued for Chinese Patent Application No. 201910822115.1 (5 pages).

3GPP TS 23.503 V15.2.0 (Jun. 2018),3rd Generation Partnership Project;Technical Specification Group Services and System Aspects;Policy and Charging Control Framework for the 5G System;Stage 2(Release 15),total 67 pages.

Ericsson, "UE Policies in a UE Policy Container",SA WG2 Meeting #127 S2-183167, Apr. 16-20, 2018, Sanya, P.R. China,Total 13 Pages.

Nokia et al., "UE Policies",3GPP TSG CT WG4 Meeting #97bis C3-184362,Sophia Antipolis, France, 9th Jul. 13, 2018,Total 18 Pages.

Liu Dong, "Design and Implementation of User Group Management System of Mycloud Based on Attribute Encryption", Xidian University, Jun. 2018, with an English abstract, total 84 pages.

Intel, "Provisioning of ANDSP and URSP via signalling",3GPP TSG-SA WG2 Meeting #127BIS S2-185166,Newport Beach, U.S., May 28 Jun. 1, 2018,Total 4 pages.

Office Action dated Jul. 15, 2022 issued in Chinese Application No. 201910822115.1 (10 pages).

International Search Report dated Jul. 24, 2020 issued for PCT/CN2020/086805 (9 pages).

Motorola Mobility et al., "Efficient delivery of UE Policies",SA WG2 Meeting #S2-129 S2-1811412, Oct. 15-19 October~ P.R. China,total 7 pages.

Ericsson et al., "UE policies granularity and UE assistance for policy evaluation",3GPP TSG-SA WG2 Meeting #125 S2-181399,Gothenburg, Sweden, Jan. 22-26, 2018,total 9 pages.

Extended European Search Report dated Sep. 29, 2022 issued for European Application No. 20861831.4 (13 pages).

\* cited by examiner

COMMUNICATION METHOD, APPARATUS, AND SYSTEM

CROSS-REFERENCE TO RELATED APPLICATIONS

This application is a continuation of International Patent Application No. PCT/CN2020/086805, filed on Apr. 24, 2020, which claims priority to Chinese Patent Application No. 201910822115.1, filed on Sep. 2, 2019. The disclosures of the aforementioned applications are hereby incorporated by reference in their entireties.

TECHNICAL FIELD

This disclosure relates to the field of mobile communication technologies, and in particular, to a communication method, apparatus, and system.

BACKGROUND

In a current user policy association establishment procedure, a policy section identifier (PSI) list provided by a terminal device for a policy control network element needs to carry all locally stored PSIs, and one PSI corresponds to one or more user route selection policies (URSPs). For a PSI that is not carried by the terminal device, the policy control network element considers that the terminal device does not have a URSP corresponding to the PSI.

However, in an actual scenario, an operator may configure URSPs at a user package granularity, and applications corresponding to the URSP configured by the operator on the terminal device may be far more than applications that have been installed or need to be used on the terminal device. In this way, a quantity of PSIs that the terminal device actually needs to report is far greater than a quantity of actually required PSIs.

In addition, because the policy control network element needs to ensure that the URSP on the terminal device is up to date, even if the terminal device does not need to use a specific application, when a URSP corresponding to the application changes, the policy control network element still needs to continuously update the URSP. Consequently, this operation causes unnecessary signaling overheads.

SUMMARY

This disclosure provides a communication method, apparatus, and system, used to determine a proper URSP for a terminal device and reduce signaling overheads of maintaining a URSP of the terminal device.

According to a first aspect, this disclosure provides a communication method. The method includes: A policy control network element receives first information from a terminal device, where the first information is a banned application identifier, a banned policy section identifier PSI, a banned user route selection policy URSP identifier, or an allowed application identifier. The policy control network element obtains a first URSP of the terminal device from a data storage network element. The policy control network element determines a second URSP of the terminal device based on the first information and the first URSP.

Based on this solution, when deciding a URSP of the terminal device, the policy control network element considers the first information reported by the terminal device, to determine a proper URSP for the terminal device. In addition, this helps avoid signaling overheads caused because the terminal device and a policy control network element side continuously update and maintain a URSP that the terminal device does not need to use.

In a possible implementation, the first information is the banned application identifier, the banned PSI, or the banned URSP identifier. The policy control network element obtains second information of the terminal device from the data storage network element, where the second information is a banned application identifier of the terminal device that is stored in the data storage network element. That the policy control network element determines a second URSP of the terminal device based on the first information and the first URSP includes: The policy control network element determines the second URSP based on the first information, the second information, and the first URSP, where the second URSP does not include a URSP corresponding to the second information and a URSP corresponding to the first information.

In a possible implementation, the policy control network element determines an updated banned application identifier based on the first information and the second information; and the policy control network element stores the updated banned application identifier in the data storage network element.

Based on this solution, the banned application identifier of the terminal device that is stored in the data storage network element may be updated.

In a possible implementation, the first information is the banned application identifier or the banned PSI. That the policy control network element determines a second URSP of the terminal device based on the first information and the first URSP includes: The policy control network element determines the second URSP based on a third URSP and the first URSP, where the second URSP does not include the third URSP determined based on the first information.

In a possible implementation, the first information is the banned PSI. The policy control network element determines the banned application identifier based on the banned PSI. The policy control network element determines the third URSP based on the banned application identifier.

In a possible implementation, the first information is the allowed application identifier. That the policy control network element determines a second URSP of the terminal device based on the first information and the first URSP includes: The policy control network element determines the second URSP based on a fourth URSP and the first URSP, where the second URSP includes the fourth URSP determined based on the allowed application identifier.

Based on this solution, the URSP of the terminal device includes a URSP corresponding to the allowed application identifier of the terminal device, so that the URSP can be added to the terminal device based on a request of the terminal device.

In a possible implementation, the first information is the banned application identifier, the banned PSI, or the banned URSP identifier. That a policy control network element receives first information from a terminal device includes: The policy control network element receives the first information from the terminal device in a registration procedure of the terminal device.

In a possible implementation, the first information is the allowed application identifier. That a policy control network element receives first information from a terminal device includes: The policy control network element receives the first information from the terminal device in a registration procedure of the terminal device or a user policy update procedure actively initiated by the terminal device.

Based on this solution, on one hand, the foregoing URSP update procedure may be initiated in the registration procedure of the terminal device, and on the other hand, the foregoing URSP update procedure may alternatively be initiated in the user policy update procedure actively initiated by the terminal device, so that implementation is flexible.

According to a second aspect, this disclosure provides a communication method. The method includes: A policy control network element sends a first URSP to a terminal device. The policy control network element receives a user policy delivery report from the terminal device, where the user policy delivery report includes first information, and the first information is a banned application identifier, a banned PSI, or a banned URSP identifier. The policy control network element updates, based on the first information, a banned application identifier stored in a data storage network element, where the banned application identifier is used by the policy control network element to perform a user policy decision, to avoid providing the terminal device with a URSP corresponding to the banned application identifier.

Based on this solution, when deciding a URSP of the terminal device, the policy control network element considers the first information reported by the terminal device. This helps avoid signaling overheads caused because the terminal device and a policy control network element side continuously update and maintain a URSP that the terminal device does not need to use.

In a possible implementation, that the policy control network element updates, based on the first information, a banned application identifier stored in a data storage network element includes: The policy control network element obtains second information from the data storage network element, where the second information is the banned application identifier stored in the data storage network element. The policy control network element determines third information based on the first information and the second information, where the third information includes at least one banned application identifier. The policy control network element stores the third information in the data storage network element, where the third information is used by the policy control network element to perform the user policy decision, to avoid providing the terminal device with a URSP corresponding to the third information.

Based on this solution, the third information may be obtained based on the first information reported by UE and the second information currently stored in a UDR, to store the third information in the UDR, that is, replace the second information in the UDR with the third information.

In a possible implementation, the policy control network element updates, based on the first information, a URSP stored in the data storage network element.

According to a third aspect, this disclosure provides a communication apparatus. The apparatus may be a policy control network element, or may be a chip used in the policy control network element. The apparatus has a function of implementing the first aspect or the embodiments of the first aspect, the second aspect or the embodiments of the second aspect. The function may be implemented by hardware, or may be implemented by hardware executing corresponding software. The hardware or the software includes one or more modules corresponding to the function.

According to a fourth aspect, this disclosure provides a communication apparatus, including a processor and a memory. The memory is configured to store computer-executable instructions. When the apparatus runs, the processor executes the computer-executable instructions stored in the memory, so that the apparatus performs the method in the foregoing aspects or the embodiments of the foregoing aspects.

According to a fifth aspect, this disclosure provides a communication apparatus. The communication apparatus includes a unit or means configured to perform the foregoing aspects or the steps in the foregoing aspects.

According to a sixth aspect, this disclosure provides a communication apparatus, including a processor and an interface circuit. The processor is configured to: communicate with another apparatus through the interface circuit, and perform the methods in the foregoing aspects or the embodiments of the foregoing aspects. There are one or more processors.

According to a seventh aspect, this disclosure provides a communication apparatus, including a processor, configured to: be connected to a memory, and invoke a program stored in the memory, to perform the methods in the foregoing aspects or the embodiments of the foregoing aspects. The memory may be located inside the apparatus, or may be located outside the apparatus. In addition, there are one or more processors.

According to an eighth aspect, this disclosure further provides a computer-readable storage medium. The computer-readable storage medium stores instructions. When the instructions are run on a computer, a processor is enabled to perform the methods in the foregoing aspects or the embodiments of the foregoing aspects.

According to a ninth aspect, this disclosure further provides a computer program product including instructions. When the computer program product runs on a computer, the computer is enabled to perform the methods in the foregoing aspects or the embodiments of the foregoing aspects.

According to a tenth aspect, this disclosure further provides a chip system, including a processor, configured to perform the methods in the foregoing aspects or the embodiments of the foregoing aspects.

According to an eleventh aspect, this disclosure provides a communication system, including a policy control network element and a data storage network element.

The policy control network element is configured to: receive first information from a terminal device, where the first information is a banned application identifier, a banned policy section identifier PSI, a banned URSP identifier, or an allowed application identifier; obtain a first URSP of the terminal device from the data storage network element; and determine a second URSP of the terminal device based on the first information and the first URSP.

The data storage network element is configured to: store the first URSP; and send the first URSP to the policy control network element.

According to a twelfth aspect, this disclosure provides a communication system, including a policy control network element and a data storage network element. The policy control network element is configured to: send a first URSP to a terminal device; receive a user policy delivery report from the terminal device, where the user policy delivery report includes first information, and the first information is a banned application identifier, a banned PSI, or a banned URSP identifier; and update, based on the first information, a banned application identifier stored in the data storage network element, where the banned application identifier is used by the policy control network element to perform a user policy decision, to avoid providing the terminal device with a URSP corresponding to the banned application identifier. The data storage network element is configured to store an updated banned application identifier.

According to a thirteenth aspect, this disclosure provides a communication method, including: A policy control network element receives first information from a terminal device, where the first information is a banned application identifier, a banned policy section identifier PSI, a banned URSP identifier, or an allowed application identifier. The policy control network element requests to obtain a first URSP of the terminal device from a data storage network element. The data storage network element sends the first URSP to the policy control network element. The policy control network element determines a second URSP of the terminal device based on the first information and the first URSP.

According to a fourteenth aspect, this disclosure provides a communication method, including: A policy control network element sends a first URSP to a terminal device. The policy control network element receives a user policy delivery report from the terminal device, where the user policy delivery report includes first information, and the first information is a banned application identifier, a banned PSI, or a banned URSP identifier. The policy control network element updates, based on the first information, a banned application identifier stored in a data storage network element, where the banned application identifier is used by the policy control network element to perform a user policy decision, to avoid providing the terminal device with a URSP corresponding to the banned application identifier. The data storage network element stores an updated banned application identifier.

DESCRIPTION OF EMBODIMENTS

To make objectives, technical solutions, and advantages of this disclosure clearer, the following further describes this disclosure in detail with reference to the accompanying drawings. A specific operation method in a method embodiment may also be applied to an apparatus embodiment or a system embodiment. In the descriptions of this disclosure, unless otherwise specified, "a plurality of" means two or more than two.

Figure 1:
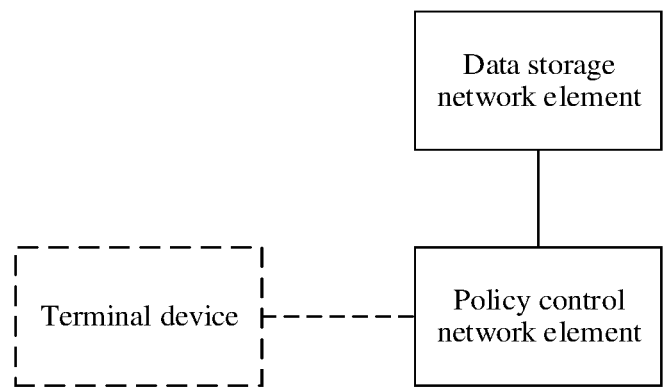
FIG. 1 is a schematic diagram of a communication system according to this disclosure.

To resolve the problem mentioned in the background, as shown in FIG. 1, this disclosure provides a communication system. The system includes a policy control network element and a data storage network element. Optionally, the communication system may further include a terminal device. For the system in FIG. 1, there are two solutions.

Solution 1:

The policy control network element is configured to: receive first information from the terminal device, where the first information is a banned application identifier, a banned PSI, a banned URSP identifier, or an allowed application identifier; obtain a first URSP of the terminal device from the data storage network element; and determine a second URSP of the terminal device based on the first information and the first URSP. The data storage network element is configured to store the first URSP, and send the first URSP to the policy control network element.

In a possible implementation, the policy control network element is further configured to obtain second information of the terminal device from the data storage network element, where the second information is a banned application identifier of the terminal device that is stored in the data storage network element. That the policy control network element is configured to determine the second URSP of the terminal device based on the first information and the first URSP specifically includes: The policy control network element is configured to determine the second URSP based on the first information, the second information, and the first URSP, where the second URSP does not include a URSP corresponding to the second information and a URSP corresponding to the first information.

In a possible implementation, the first information is the banned application identifier, the banned PSI, or the banned URSP identifier. The policy control network element is further configured to: determine an updated banned application identifier based on the first information and the second information; and store the updated banned application identifier in the data storage network element. The data storage network element is further configured to store the updated banned application identifier.

In a possible implementation, the first information is the banned application identifier or the banned PSI. That the policy control network element is configured to determine the second URSP of the terminal device based on the first information and the first URSP specifically includes: determining the second URSP based on a third URSP and the first URSP, where the second URSP does not include the third URSP determined based on the first information.

In a possible implementation, the first information is the banned PSI. The policy control network element is further configured to: determine the banned application identifier based on the banned PSI; and determine the third URSP based on the banned application identifier.

In a possible implementation, the first information is the allowed application identifier. That the policy control network element is configured to determine the second URSP of the terminal device based on the first information and the first URSP specifically includes: determining the second URSP based on a fourth URSP and the first URSP, where the second URSP includes the fourth URSP determined based on the allowed application identifier.

In a possible implementation, the first information is the banned application identifier, the banned PSI, or the banned URSP identifier. That the policy control network element is configured to receive the first information from the terminal device specifically includes: The policy control network element is configured to receive the first information from the terminal device in a registration procedure of the terminal device.

In a possible implementation, the first information is the allowed application identifier. That the policy control network element is configured to receive the first information from the terminal device specifically includes: The policy control network element is configured to receive the first information from the terminal device in a registration procedure of the terminal device or a user policy update procedure actively initiated by the terminal device.

In a possible implementation, the terminal device is configured to: send the first information to the policy control network element; and receive a fifth URSP from the policy control network element, where the fifth URSP is determined based on the first URSP and the second URSP.

Solution 2:

The policy control network element is configured to: send a first URSP to the terminal device; receive a user policy delivery report from the terminal device, where the user policy delivery report includes first information, and the first information is a banned application identifier, a banned PSI, or a banned URSP identifier; and update, based on the first information, a banned application identifier stored in the data storage network element, where the banned application identifier is used by the policy control network element to perform a user policy decision, to avoid providing the terminal device with a URSP corresponding to the banned application identifier. The data storage network element is configured to store an updated banned application identifier.

In a possible implementation, that the policy control network element is configured to update, based on the first information, the banned application identifier stored in the data storage network element specifically includes: obtaining second information from the data storage network element, where the second information is the banned application identifier stored in the data storage network element; determining third information based on the first information and the second information, where the third information includes at least one banned application identifier; and storing the third information in the data storage network element, where the third information is used by the policy control network element to perform the user policy decision, to avoid providing the terminal device with a URSP corresponding to the third information.

In a possible implementation, the policy control network element is further configured to update, based on the first information, a URSP stored in the data storage network element.

In a possible implementation, the terminal device is configured to: receive the first URSP; and send the user policy delivery report to the policy control network element.

Figure 2A:
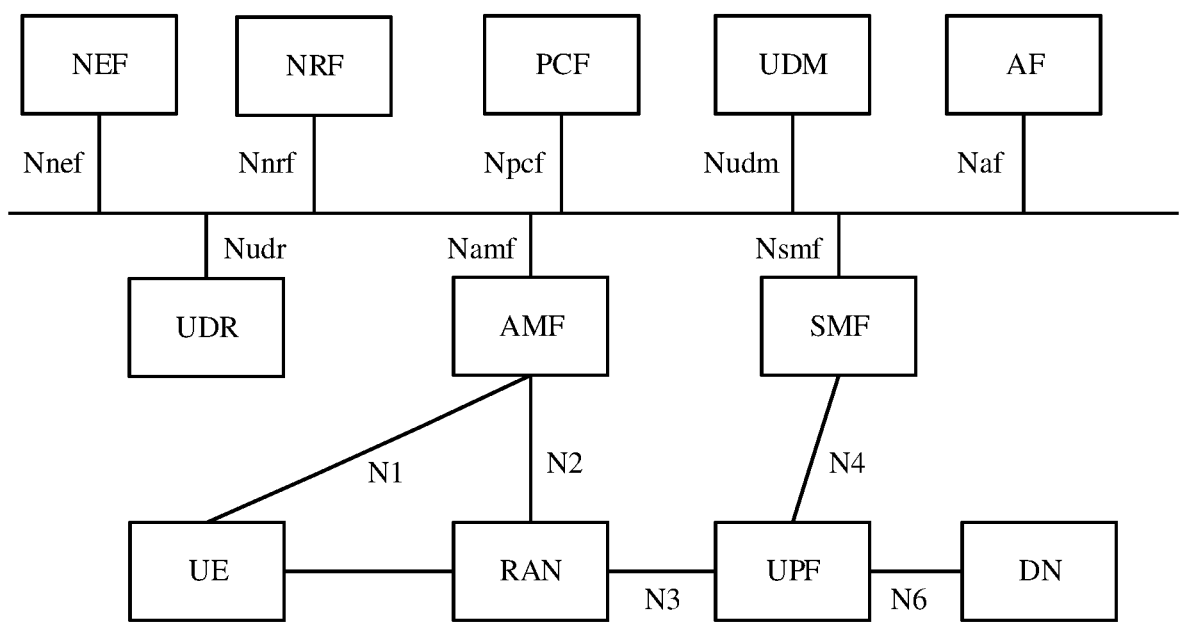
FIG. 2A is a schematic diagram of a 5G network architecture based on a service-oriented architecture.

FIG. 2A is a schematic diagram of a 5th generation (5G) network architecture based on a service-oriented architecture. The 5G network architecture shown in FIG. 2A may include three parts: a terminal device, a data network (DN), and a carrier network. The following briefly describes functions of some network elements.

The carrier network may include one or more of the following network elements: a network exposure function (NEF) network element, a policy control function (PCF) network element, a unified data management (UDM) network element, a unified data repository (UDR) network element, a network repository function (NRF) network element, an application function (AF) network element, an access and mobility management function (AMF) network element, a session management function (SMF) network element, a radio access network (RAN), a user plane function (UPF) network element, and the like. In the foregoing carrier network, parts other than the radio access network may be referred to as core network parts.

The terminal device, which may also be referred to as user equipment (UE), is a device that has a wireless transceiver function. The terminal device may be deployed on land, where the deployment includes indoor or outdoor, or handheld or vehicle-mounted deployment; may be deployed on water (for example, on a ship); or may be deployed in air (for example, on an airplane, a balloon, or a satellite). The terminal device may be a mobile phone, a tablet computer (pad), a computer that has a wireless transceiver function, a virtual reality (VR) terminal, an augmented reality (AR) terminal, a wireless terminal in industrial control, a wireless terminal in self driving a wireless terminal in telemedicine (remote medical), a wireless terminal in a smart grid, a wireless terminal in transportation safety, a wireless terminal in a smart city, a wireless terminal in a smart home, or the like.

The terminal device may establish a connection to the carrier network through an interface (for example, N1) provided by the carrier network, and use services such as a data service and/or a voice service provided by the carrier network. The terminal device may further access the DN through the carrier network, and use a carrier service deployed on the DN and/or a service provided by a third party. The third party may be a service provider other than the carrier network and the terminal device, and may provide services such as a data service and/or a voice service for the terminal device. A specific representation form of the third party may be specifically determined based on an actual application scenario, and is not limited herein.

The RAN is a sub-network of the carrier network, and is an implementation system between a service node in the carrier network and the terminal device. To access the carrier network, the terminal device first passes through the RAN, and may be connected to the service node of the carrier network through the RAN. A RAN device in this disclosure is a device that provides a wireless communication function for a terminal device, and the RAN device is also referred to as an access network device. The RAN device in this disclosure includes but is not limited to: a next generation NodeB (gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmission reception point (TRP), a transmission point (TP), a mobile switching center, and the like.

The AMF network element mainly performs functions such as mobility management, and access authentication/authorization. In addition, the AMF network element is further responsible for transferring user policies between the UE and the PCF.

The SMF network element mainly performs functions such as session management, execution of a control policy delivered by the PCF, UPF selection, and UE IP address allocation.

The UPF network element serves as an interface UPF of the data network, and implements functions such as user plane data forwarding, session/flow-based charging statistics, and bandwidth limitation.

The UDM network element is mainly responsible for functions such as subscription data management and user access authorization.

The UDR network element is mainly responsible for a function of accessing types of data such as subscription data, policy data, and application data.

The NEF network element is mainly configured to support capability and event exposure.

The AF network element mainly transfers a requirement of an application side on a network side, for example, a quality of service (QoS) requirement or user status event subscription. The AF may be a third-party functional entity, or may be an application service deployed by an operator, for example, an IP multimedia subsystem (IMS) voice call service.

The PCF network element is mainly responsible for policy control functions such as session-level or service flow-level charging, QoS bandwidth guarantee and mobility management, and UE policy decision. In this architecture, PCFs connected to the AMF and the SMF are separately an AM PCF (PCF for Access and Mobility Control) and an SM PCF (PCF for Session Management). In an actual deployment scenario, the PCFs may not be a same PCF entity.

The NRF network element may be configured to provide a network element discovery function and provide network element information corresponding to a network element type based on a request from another network element. The NRF further provides a network element management service, for example, registration, update, and deregistration of a network element and subscription and push of a network element status.

The DN is a network outside the carrier network. The carrier network may access a plurality of DNs. A plurality of services may be deployed on the DN, and the DN may provide services such as a data service and/or a voice service for the terminal device. For example, the DN is a private network of a smart factory, a sensor installed in a workshop of the smart factory may be a terminal device, a control server of the sensor is deployed in the DN, and the control server may provide a service for the sensor. The sensor may communicate with the control server, to obtain instructions of the control server, transmit collected sensor data to the control server according to the instructions, and the like. For another example, the DN is an internal office network of a company, a mobile phone or a computer of an employee of the company may be a terminal device, and the mobile phone or the computer of the employee may access information, data resources, and the like on the internal office network of the company.

In FIG. 2A, Nnef, Npcf, Nudm, Naf, Namf, Nsmf, N1, N2, N3, N4, and N6 are interface serial numbers. For meanings of these interface serial numbers, refer to meanings defined in the 3rd generation partnership project (3GPP) standard protocol. This is not limited herein.

Figure 2B:
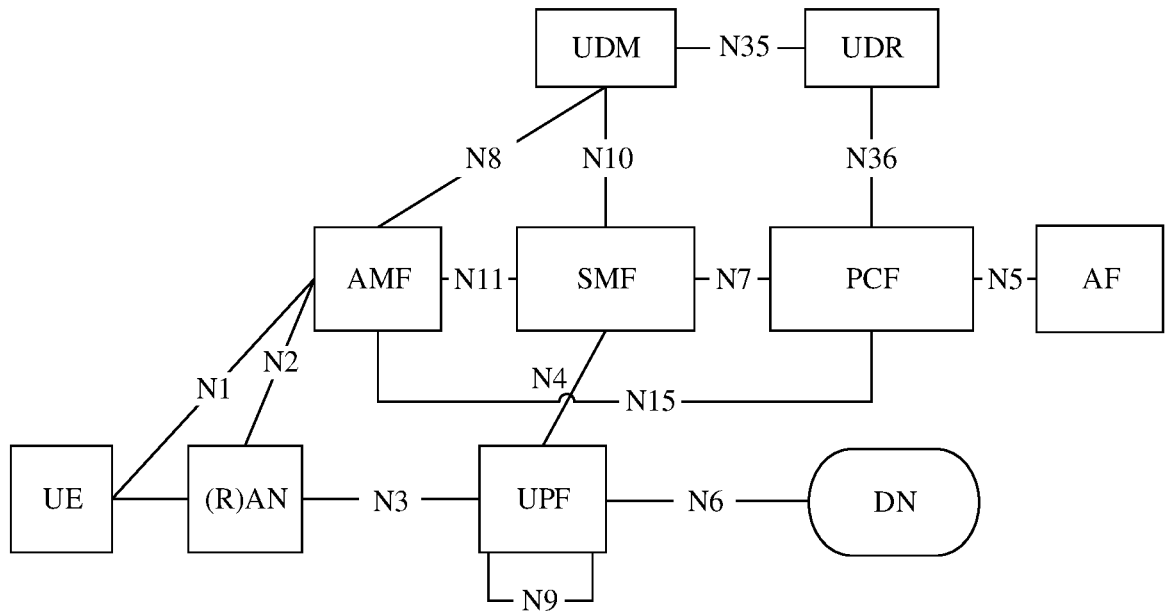
FIG. 2B is a schematic diagram of a 5G network architecture based on a point-to-point interface.

FIG. 2B is a schematic diagram of a 5G network architecture based on a point-to-point interface. For descriptions of functions of network elements in FIG. 2B, refer to descriptions of functions of corresponding network elements in FIG. 2A. Details are not described again. A main difference between FIG. 2B and FIG. 2A lies in that interfaces between network elements in FIG. 2B are point-to-point interfaces rather than service-oriented interfaces.

In the architecture shown in FIG. 2B, names and functions of the interfaces between the network elements are as follows:

(1) N7 represents an interface between the PCF and the SMF, and is configured to deliver a protocol data unit (PDU) session granularity control policy and a service data flow granularity control policy.

(2) N15 represents an interface between the PCF and the AMF, and is configured to deliver a UE policy and an access control related policy.

(3) N5 represents an interface between the AF and the PCF, and is configured to deliver an application service request and report a network event.

(4) N4 represents an interface between the SMF and the UPF, and is configured to transfer information between a control plane and a user plane, including delivery of forwarding rules, QoS control rules, traffic statistics rules, and the like from the control plane to the user plane, and reporting of user plane information.

(5) N11 represents an interface between the SMF and the AMF, and is configured to: transfer PDU session tunnel information between the RAN and the UPF, transfer a control message to be sent to the UE, transfer radio resource control information to be sent to the RAN, and the like.

(6) N2 represents an interface between the AMF and the RAN, and is configured to transfer radio bearer control information and the like from a core network side to the RAN.

(7) N1 represents an interface between the AMF and the UE, is access-irrelevant, and is configured to transfer the QoS control rule and the like to the UE.

(8) N8 represents an interface between the AMF and the UDM, and is used by the AMF to obtain, from the UDM, subscription data and authentication data related to access and mobility management, and used by the AMF to register current mobility management related information of the UE with the UDM.

(9) N10 represents an interface between the SMF and the UDM, and is used by the SMF to obtain, from the UDM, subscription data related to session management, and used by the SMF to register current session related information of the UE with the UDM.

(10) N35 represents an interface between the UDM and the UDR, and is used by the UDM to obtain user subscription data information from the UDR.

(11) N36 represents an interface between the PCF and the UDR, and is used by the PCF to obtain policy-related subscription data and application data related information from the UDR.

Further, the current 3GPP standard defines two roaming manners for user access at a visited location, that is, home-routed roaming and local breakout roaming. The 5G architecture shown in FIG. 2B is used as an example. A home-routed roaming architecture and a local breakout roaming architecture are respectively as shown in FIG. 2C and FIG. 2D.

Figure 2C:
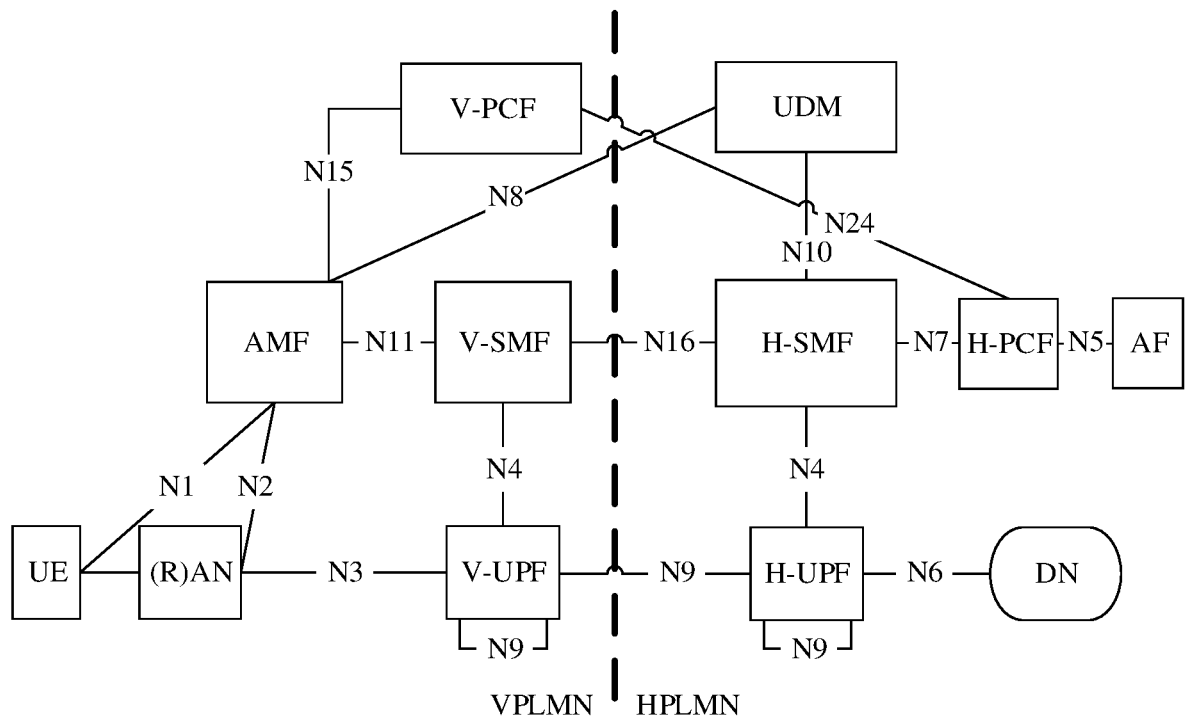
FIG. 2C is a home-routed roaming architecture in 5G.

With reference to the home-routed roaming architecture shown in FIG. 2C, in the diagram of the roaming architecture, an AMF and an SMF are respectively located at a visited location and a home location, and a session management function is performed by a home H-SMF that supports interaction with a UDM/an H-PCF. In addition, an H-PCF connected to a V-PCF and an H-PCF connected to the H-SMF may not be a same PCF entity in an actual application scenario. It should be noted that a URSP in the solutions of this disclosure may be provided by the H-PCF in the architecture, or may be provided by the V-PCF in the architecture.

Figure 2D:
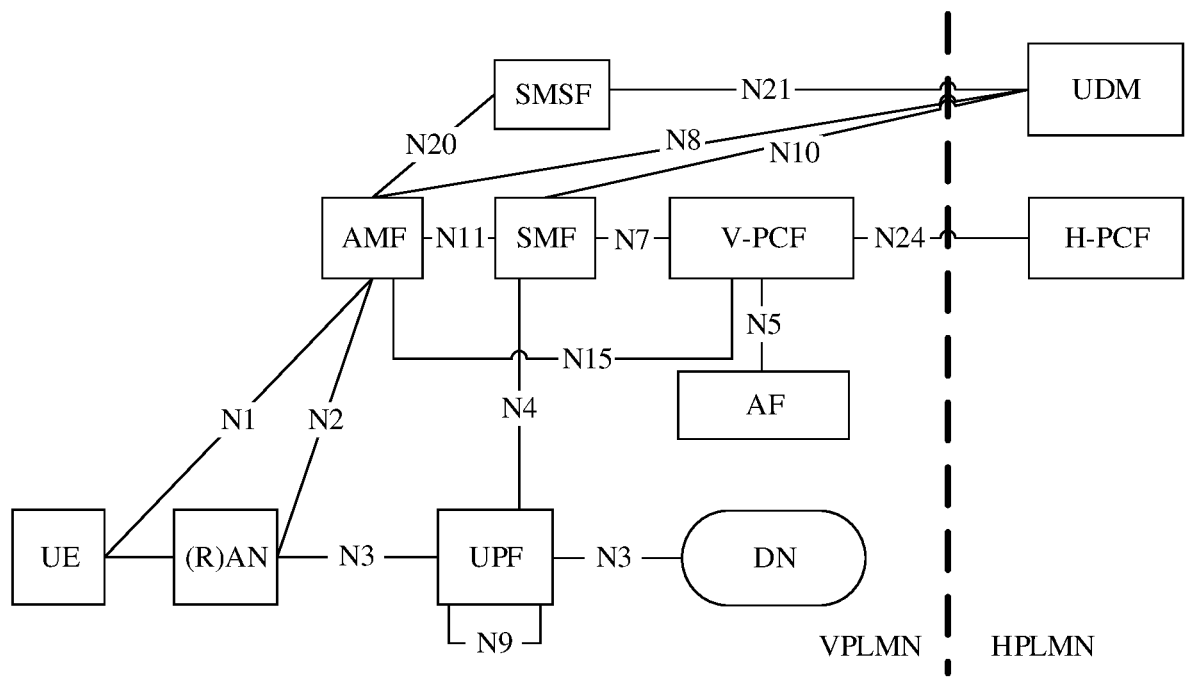
FIG. 2D is a local breakout roaming architecture in 5G.

With reference to the local breakout roaming architecture shown in FIG. 2D, in the diagram of the roaming architecture, both an AMF and an SMF are located at a visited location, and in this case, a session management function is performed by the SMF functional entity at the visited location. In addition, a V-PCF connected to the AMF and a V-PCF connected to the SMF may not be a same PCF entity in an actual application scenario. It should be noted that, in the current standard, a URSP in the solutions of this disclosure may be provided by an H-PCF in the architecture, or may be provided by the V-PCF in the architecture.

It may be understood that the network elements or the functions may be network elements in a hardware device, software functions running on dedicated hardware, or virtualized functions instantiated on a platform (for example, a cloud platform). Optionally, the foregoing network elements or functions may be implemented by one device, or may be jointly implemented by a plurality of devices, or may be one function module in one device. This is not specifically limited in the embodiments of this disclosure.

The mobility management network element, the session management network element, the policy control network element, the application function network element, the access network device, the network exposure function network element, the user plane network element, and the data storage network element in this disclosure may be respectively the AMF, the SMF, the PCF, the AF, the RAN, the NEF, the UPF, and the UDR in FIG. 2A, FIG. 2B, FIG. 2C, or FIG. 2D, or may be network elements that have functions of the AMF, the SMF, the PCF, the AF, the RAN, the NEF, the UPF, and the UDR in future communication such as a 6th generation (6G) network. This is not limited in this disclosure. For ease of description, in this disclosure, that the mobility management network element, the session management network element, the policy control network element, the application function network element, the access network device, the network exposure function network element, the user plane network element, and the data storage network element are respectively the AMF, the SMF, the PCF, the AF, the RAN, the NEF, the UPF, and the UDR is used as an example for description. Further, a terminal device is referred to as UE for short in this disclosure.

For ease of understanding the solutions of this disclosure, the following first describes related background technologies.

1. General User Registration Procedure

The general user registration procedure may be briefly described as follows: UE sends a registration request to an AMF through an AN. The AMF obtains subscription data from a specific UDM based on a user identifier. After receiving a request, the UDM may obtain actual subscription data from a UDR. In addition, the AMF may further initiate a user policy association establishment request (UEPolicy-Control_Create Request) and an access management policy association establishment request (AMPolicyControl_Create Request) to a PCF, to obtain a UE policy and an access control policy respectively. In this process, the PCF returns the access control policy to the AMF, and provides the UE policy to the UE through the AMF.

2. General Session Establishment Procedure

The general session establishment procedure may be briefly described as follows: UE sends a session establishment request to an AMF through a RAN. The AMF selects an SMF to provide a service for a session, stores a correspondence between the SMF and the PDU session, and sends the session establishment request to the SMF. The SMF selects a corresponding UPF for the UE, establishes a user plane transmission path, and allocates an IP address to the UE. In this process, the SMF further initiates a policy control session establishment request to a PCF to establish a policy control session between the SMF and the PCF. During the policy control session establishment procedure, the SMF stores a correspondence between the policy control session and the PDU session. In addition, an AF may establish an AF session with the PCF, and the PCF binds the AF session to the policy control session.

3. UE Policy Mechanism

The current standard defines two user policies, which are separately an access network discovery and selection policy (ANDSP) and a URSP policy. The former may be provided by both an H-PCF and a V-PCF, and is mainly used to indicate UE to select non-3GPP access network information, for example, information about an access network and an access node. The latter is provided only by the H-PCF, and is mainly used by the UE to decide how to select a routing policy for a to-be-transmitted service data flow, for example, whether the service flow supports offloading to Non-3GPP access, or select information such as a specific data network name (DNN), single network slice selection assistance information (S-NSSAI), and a session and service continuity mode (SSC mode) to transmit the service data flow. The solutions of this disclosure are mainly used for a URSP scenario.

In addition, to reduce a signaling volume when a user policy is updated between the UE and the PCF, the PCF may combine one or more URSPs into one PSI, and/or combine one or more ANDSPs into one PSI, and provide the PSI and a corresponding UE policy for the UE when delivering the user policy. Subsequently, when determining that a locally stored URSP needs to be provided for the PCF, the UE only needs to carry a PSI list, and the PCF may also perform an operation, for example, modification or deletion, on a corresponding user policy for each PSI.

A URSP mainly includes two parts: traffic description information (Traffic descriptor) and a list of pieces of route selection description information (List of Route Selection Descriptors). The traffic description information includes, for example, an operating system identifier (OS ID), an application identifier (APP ID), an IP triplet, and domain description information. The route selection description information includes S-NSSAI, a DNN, an SSC mode, and the like.

4. A Procedure in which UE Performs URSP Matching

When determining that a specific service or application needs to be initiated, the UE performs matching between the to-be-initiated service or application and traffic description information in a received URSP rule in sequence based on a priority of the URSP rule. If a specific URSP rule is matched (where the URSP rule may also be a default URSP rule, for example, traffic description information is Match-all), the UE further needs to determine whether an existing PDU session meets a definition of route selection description information in the URSP.

(1) If information such as a DNN, S-NSSAI, and an SSC mode corresponding to the existing PDU session is consistent with corresponding information in the route selection description information corresponding to the matched URSP rule, the UE may choose to initiate a PDU session modification request based on the existing PDU session. The PDU session modification request may carry parameters including a current PDU session ID and an N1 SM container (that is, the PDU session modification request (PDU session ID, packet filters, operation, requested QoS)). The PDU session ID is used by an AMF to associate with a specific session context. The N1 SM container is transparently transmitted to an SMF through the AMF, to indicate a specific service that the UE expects to initiate and a QoS guarantee required by the service.

(2) If all of the existing PDU session(s) cannot match the RSD information of the URSP, the UE initiates a PDU session establishment request for the service/application, and includes, in the request message sent to an AMF, parameters such as a newly allocated PDU session ID, and a DNN, S-NSSAI, and an N1 SM container (SSC mode, PDU session type) in the RSD. The newly allocated PDU session ID is used to identify a PDU session corresponding to the PDU session establishment request. The DNN and the S-NSSAI are used as parameters used by the AMF to select an SMF entity for the PDU session establishment request. The N1 SM container is transparently transmitted to the selected SMF through the AMF.

5. UE Policy Delivery Procedure

Figure 3:
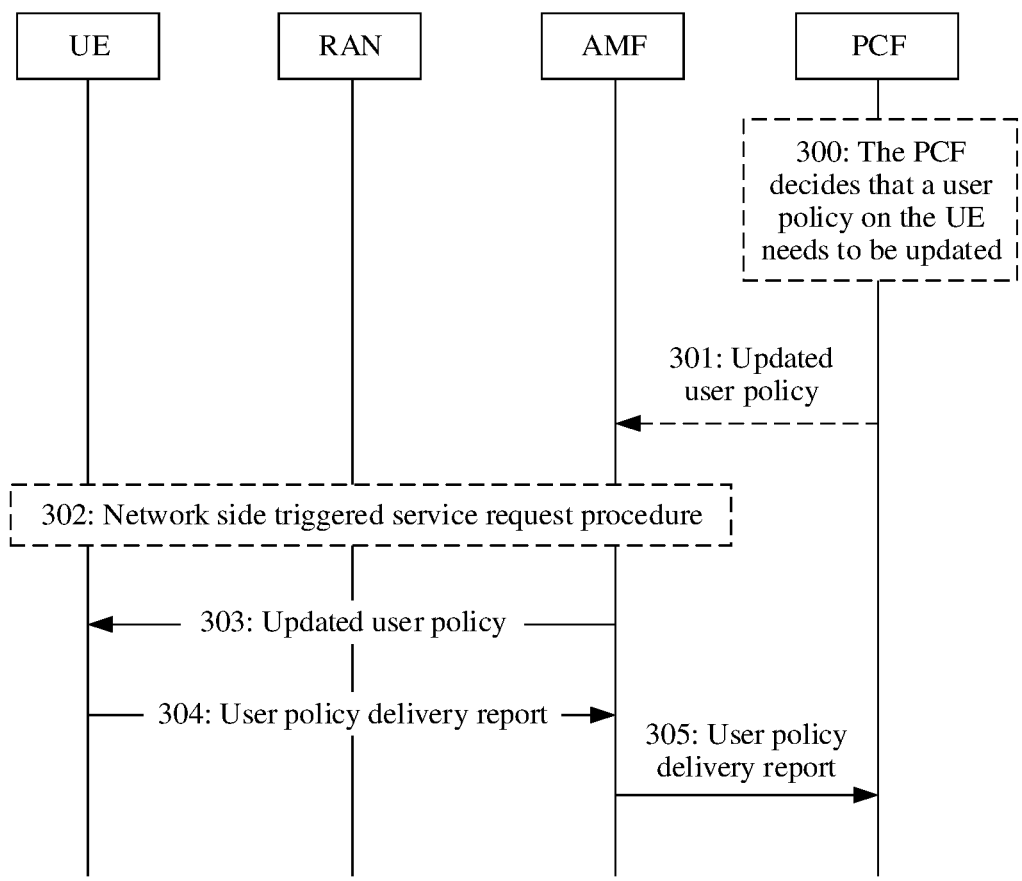
FIG. 3 is a schematic flowchart of delivering a user policy in the current technology.

FIG. 3 is a schematic flowchart of delivering a user policy in the current technology. This schematic diagram describes a procedure in which a PCF delivers a user policy to UE, and is applicable to an initial request scenario or an update request scenario in which the PCF provides a user policy for the UE.

The procedure is specifically described as follows.

Step 300: After receiving a user policy association establishment request initiated by an AMF, the PCF decides that a user policy on the UE needs to be updated, or the PCF triggers a decision to update a user policy on the UE based on an event.

Step 301: The PCF sends an updated user policy to the AMF. Correspondingly, the AMF may receive the updated user policy.

Specifically, the PCF invokes a service of the AMF to send the updated user policy to the AMF by using an Namf_Communication_N1N2MessageTransfer message.

Step 302: If the UE is in an idle state, the AMF further needs to initiate a network side triggered service request (Network Triggered Service Request) procedure, so that the UE enters a connected state.

This step is optional.

Step 303: The AMF sends the updated user policy to the UE through a RAN.

Step 304: The UE includes a user policy delivery report in a response message and sends the response message to the AMF.

Step 305: The AMF forwards the received user policy delivery report to the PCF.

Specifically, the AMF may send the user policy delivery report to the PCF by invoking an Namf_N1MessageNotify message.

The PCF needs to maintain the latest user policy content sent to the UE and store the information in a UDR when a user policy association is released.

6. User Policy Association Establishment Procedure

Figure 4:
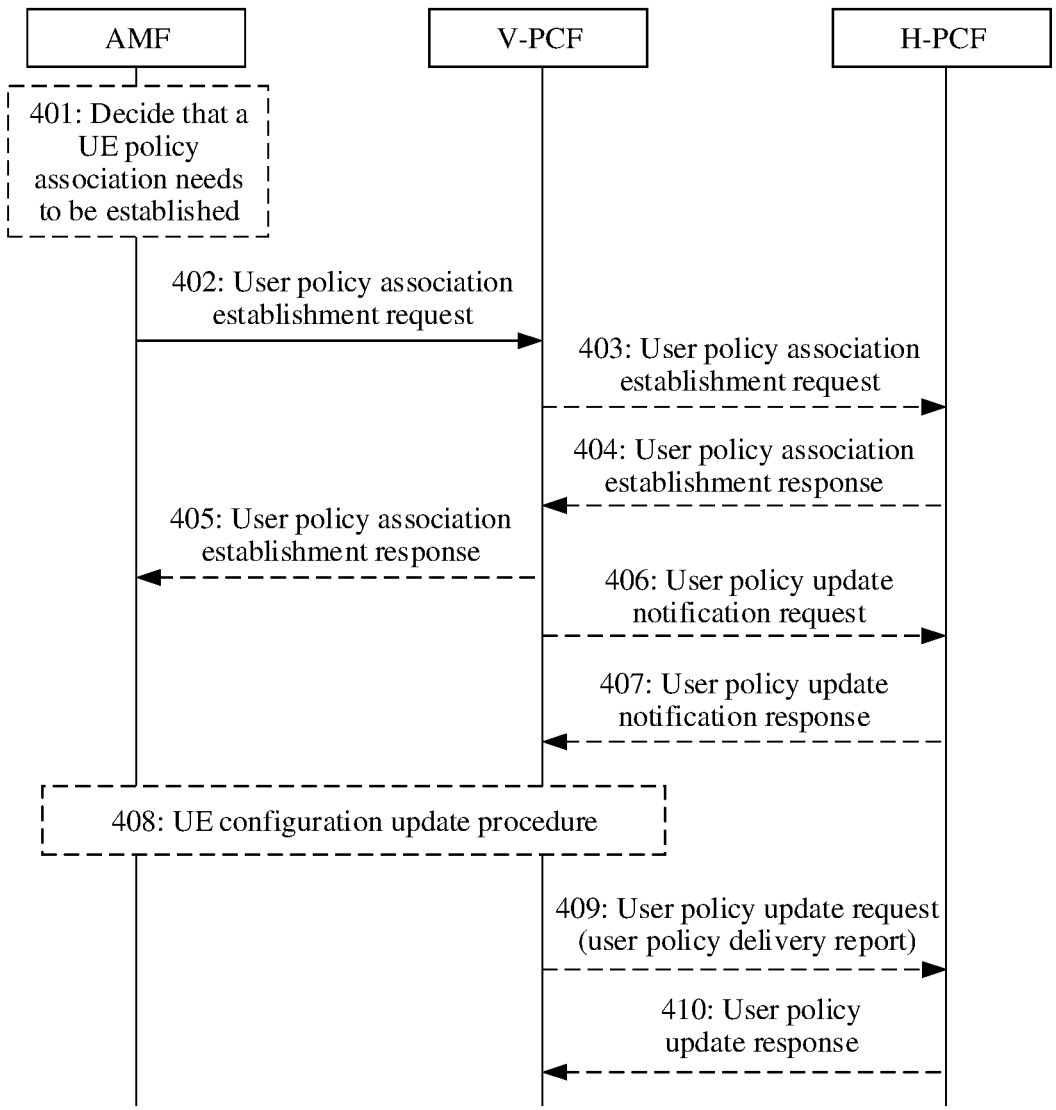
FIG. 4 is a schematic flowchart of establishing a user policy association in the current technology.

FIG. 4 is a schematic flowchart of establishing a user policy association in the current technology. When UE is initially registered with a 5G network or is handed over from a 4th generation (4G) network to a 5G network, the UE needs to provide a locally stored PSI list for a PCF, so that the PCF can determine whether to update a URSP on the UE. For a specific process, refer to the following figure.

The process may be briefly described as follows.

Step 401: An AMF decides to establish a UE policy association (decision to establish a UE policy association).

Specifically, the AMF receives a registration request sent by the UE. The registration request may be a registration request corresponding to initial registration of the UE in 5G, or may be a mobility registration request initiated when the UE is handed over from 4G to 5G. In the registration request, the UE needs to include the locally stored PSI list, to notify the PCF of a locally stored user policy list. The PSI list is carried in a UE policy container and sent to the AMF, that is, the UE policy container (list of stored PSIs, OS ID, indication of UE support for ANDSP). The indication of UE support for ANDSP is used to indicate whether an ANDSP is supported. The container is transparently forwarded to the PCF through the AMF.

Step 402: The AMF sends a user policy association establishment request (Npcf_UEPolicyControl_Create Request) to a V-PCF (PCF in a non-roaming scenario), where the request may include a subscription permanent identifier (SUPI), a permanent equipment identifier (PEI), an access type, a radio access type (RAT Type), and a UE policy container (list of stored PSIs, OS ID, indication of UE support for ANDSP).

Step 403: The V-PCF forwards the user policy association establishment request to an H-PCF.

Step 404: The H-PCF returns a user policy association establishment response (Npcf_UEPolicyControl_Create Response) to the V-PCF, where the user policy association establishment response carries event subscription information.

Step 405: The V-PCF returns the user policy association establishment response to the AMF, where the user policy association establishment response carries the event subscription information received from the H-PCF.

Optionally, the V-PCF may further subscribe to another event.

Step 406 to step 408: The H-PCF obtains policy subscription related information from a UDR, where the information includes a PSI and corresponding policy content stored in the UDR, and previously stored information such as the OS ID and an ANDSP capability indication; performs a corresponding policy decision; and determines whether to update a UE policy stored on the UE.

To update the user policy stored on the UE:

In a roaming scenario, the H-PCF provides an updated user policy for the V-PCF by using an UpdateNotify message, and the V-PCF triggers a UE configuration update procedure (UE Configuration Update procedure) to update the user policy on the UE.

In the non-roaming scenario, the H-PCF triggers a UE configuration update procedure to update the user policy on the UE.

Step 409 and step 410: In the roaming scenario, after receiving a user policy delivery report returned by the AMF, the V-PCF further includes the user policy delivery report in a user policy update request, and sends the user policy update request to the H-PCF. Correspondingly, the H-PCF returns a user policy update response to the V-PCF.

In the user policy association establishment procedure shown in FIG. 4, the list of PSIs provided by the UE for the PCF needs to carry all locally stored PSI IDs. For a PSI that is not carried by the UE, the PCF considers that the UE does not have a user policy corresponding to the PSI. However, in an actual scenario, an operator may configure URSPs at a user package granularity, and applications corresponding to the URSP configured by the operator on the UE may be far more than applications that have been installed or may be used on the UE. In this way, a quantity of PSIs included in the PSI list that the UE actually needs to report is far greater than a quantity of actually required PSIs.

In addition, because the PCF needs to ensure that the URSP on the UE is up to date, even if the UE does not need to use a specific application, when a URSP corresponding to the application changes (for example, a traffic descriptor needs to be updated due to a change of an application server, or route selection description information in an RSD needs to be updated due to a change of a user location), the PCF still needs to continuously update the URSP. Consequently, this operation causes unnecessary signaling overheads.

Based on this, this disclosure provides a solution in which a user side assists a PCF in performing a URSP decision, to avoid signaling overheads caused because UE and a PCF side continuously update and maintain a URSP that the UE does not need to use.

The following describes the communication method provided in this disclosure. Based on any architecture in FIG. 1, and FIG. 2A to FIG. 2D, FIG. 5A is a schematic flowchart of a communication method according to this disclosure. The method includes the following steps.

Step 501a: UE sends first information to a PCF. Correspondingly, the PCF may receive the first information.

The first information is a banned application identifier, a banned PSI, a banned URSP identifier, or an allowed application identifier.

An application identifier is used to identify information about an application, for example, may be an APP ID, an APP triplet, or domain description information. One PSI corresponds to one or more URSPs.

Step 502a: The PCF obtains a first URSP of the UE from a UDR.

Step 503a: The PCF determines a second URSP of the UE based on the first information and the first URSP.

Based on this solution, when deciding a URSP of the UE, the PCF considers the first information reported by the UE, to determine a proper URSP for the UE. In addition, this helps avoid signaling overheads caused because the UE and a PCF side continuously update and maintain a URSP that the UE does not need to use.

The following provide descriptions in several cases based on specific content of the first information.

Case 1: The first information is the banned application identifier.

Based on this case, in a first implementation, for example, step 503a may be: The PCF determines a third URSP based on the first information, and then the PCF determines the second URSP based on the third URSP and the first URSP, where the second URSP does not include the third URSP.

Based on this case, in a second implementation, the PCF further obtains second information of the UE from the UDR, where the second information is a banned application identifier of the UE that is stored in the UDR. In this case, for example, step 503a may be: The PCF determines the second URSP based on the first information, the second information, and the first URSP, where the second URSP does not include a URSP corresponding to the second information and a URSP corresponding to the first information.

The following describes the foregoing two different implementations with reference to a specific example.

(1) The first information (that is, the banned application identifier) received by the PCF from the UE includes APP ID 1, and a URSP corresponding to APP ID 1 is URSP 1.

(2) The first URSP obtained by the PCF from the UDR includes URSP 1, URSP 2, URSP 3, URSP 4, and URSP 5.

(3) The second information (that is, the banned application identifier) currently stored in the UDR includes APP ID 2 and APP ID 3, a URSP corresponding to APP ID 2 is URSP 2, and a URSP corresponding to APP ID 3 is URSP 3.

Based on the first implementation, the PCF first determines a URSP corresponding to the first information, that is, URSP 1, to obtain the second URSP by excluding URSP 1 from the first URSP. That is, the second URSP includes URSP 2, URSP 3, URSP 4, and URSP 5.

Based on the second implementation, the PCF first determines, based on the first information and the second information, combined banned application identifiers, that is, APP ID 1, APP ID 2, and APP ID 3, and then determines corresponding URSPs, that is, URSP 1, URSP 2, and URSP 3, to obtain the second URSP by excluding URSP 1, URSP 2, and URSP 3 from the first URSP. That is, the second URSP includes URSP 4 and URSP 5.

It can be learned that, a main difference between the two implementations lies in that: In the first implementation, only a URSP corresponding to the banned application identifier reported by the UE is excluded. However, in the second implementation, not only a URSP corresponding to the banned application identifier reported by the UE is excluded, but also a URSP corresponding to the banned application identifier of the UE that is stored in the UDR is excluded.

Case 2: The first information is the banned PSI.

Based on this case, in a first implementation, step 503a is specifically: The PCF determines the banned application identifier based on the banned PSI, and determines a third URSP based on the banned application identifier. Then the PCF determines the second URSP based on the third URSP and the first URSP, where the second URSP does not include the third URSP.

Based on this case, in a second implementation, the PCF further obtains second information of the UE from the UDR, where the second information is a banned application identifier of the UE that is stored in the UDR. In this case, step 503a is specifically: The PCF determines the second URSP based on the first information, the second information, and the first URSP, where the second URSP does not include a URSP corresponding to the second information and a URSP corresponding to the first information.

The following describes the foregoing two different implementations with reference to a specific example.

(1) The first information (that is, the banned PSI) received by the PCF from the UE includes PSI 1, a banned application identifier corresponding to PSI 1 is APP ID 1, and a URSP corresponding to APP ID 1 is URSP 1.

(2) The first URSP obtained by the PCF from the UDR includes URSP 1, URSP 2, URSP 3, URSP 4, and URSP 5.

(3) The second information (that is, the banned application identifier) currently stored in the UDR includes APP ID 2 and APP ID 3, a URSP corresponding to APP ID 2 is URSP 2, and a URSP corresponding to APP ID 3 is URSP 3.

Based on the first implementation, the PCF first determines a URSP corresponding to the first information, that is, URSP 1, to obtain the second URSP by excluding URSP 1 from the first URSP. That is, the second URSP includes URSP 2, URSP 3, URSP 4, and URSP 5.

Based on the second implementation, the PCF first determines the banned APP ID 1 based on the first information, determines, based on the banned APP ID 1 and the second information, combined banned application identifiers, that is, APP ID 1, APP ID 2, and APP ID 3, and then determines corresponding URSPs, that is, URSP 1, URSP 2, and URSP 3, to obtain the second URSP by excluding URSP 1, URSP 2, and URSP 3 from the first URSP. That is, the second URSP includes URSP 4 and URSP 5.

It can be learned that, a main difference between the two implementations lies in that: In the first implementation, only a URSP corresponding to the banned PSI reported by the UE is excluded. However, in the second implementation, not only a URSP corresponding to the banned PSI reported by the UE is excluded, but also a URSP corresponding to the banned application identifier of the UE that is stored in the UDR is excluded.

Case 3: The first information is the banned URSP identifier.

Based on this case, in a first implementation, step 503*a* is specifically: The PCF deletes a URSP corresponding to the first information in the first URSP, to obtain the second URSP.

Based on this case, in a second implementation, the PCF further obtains second information of the UE from the UDR, where the second information is a banned application identifier of the UE that is stored in the UDR. In this case, step 503*a* is specifically: The PCF determines the second URSP based on the first information, the second information, and the first URSP, where the second URSP does not include a URSP corresponding to the second information and a URSP corresponding to the first information.

The following describes the foregoing two different implementations with reference to a specific example.
(1) The first information (that is, the banned URSP identifier) received by the PCF from the UE includes URSP 1 ID.
(2) The first URSP obtained by the PCF from the UDR includes URSP 1, URSP 2, URSP 3, URSP 4, and URSP 5.
(3) The second information (that is, the banned application identifier) currently stored in the UDR includes APP ID 2 and APP ID 3, a URSP corresponding to APP ID 2 is URSP 2, and a URSP corresponding to APP ID 3 is URSP 3.

Based on the first implementation, the PCF obtains the second URSP by excluding URSP 1 from the first URSP. That is, the second URSP includes URSP 2, URSP 3, URSP 4, and URSP 5.

Based on the second implementation, the PCF determines that URSPs corresponding to the second information include URSP 2 and URSP 3, to obtain the second URSP by excluding URSP 1, URSP 2, and URSP 3 from the first URSP. That is, the second URSP includes URSP 4 and URSP 5.

It can be learned that, a main difference between the two implementations lies in that: In the first implementation, only a URSP corresponding to the banned URSP identifier reported by the UE is excluded. However, in the second implementation, not only a URSP corresponding to the banned URSP identifier reported by the UE is excluded, but also a URSP corresponding to the banned application identifier of the UE that is stored in the UDR is excluded.

For case 1 to case 3, the PCF may further determine an updated banned application identifier based on the first information and the second information, and store the updated banned application identifier in the UDR. With reference to the foregoing examples, the updated banned application identifier of the UE that is stored in the UDR includes APP ID 1, APP ID 2, and APP ID 3.

For the case 1 to case 3, in an implementation, step 501*a* may be, for example, that the UE sends the first information to the PCF in a registration procedure.

Case 4: The first information is the allowed application identifier.

Based on this case, in an implementation, step 503*a* is specifically: The PCF determines, based on the first information, that a URSP corresponding to the first information is a fourth URSP. In this case, the PCF determines that the second URSP includes the fourth URSP. Further, the second URSP may include a URSP in the first URSP. That is, latest URSPs (namely, the second URSP) of the UE that are decided by the PCF include both a URSP (which may be understood as a newly added URSP) corresponding to the allowed application identifier reported by the UE and a URSP (which may be understood as a historical URSP of the UE) that is sent to the UE.

The following describes this implementation with reference to a specific example.
(1) The first information (that is, the allowed application identifier) received by the PCF from the UE includes APP ID 4, and a URSP corresponding to APP ID 4 is URSP 6.
(2) The first URSP obtained by the PCF from the UDR includes URSP 1, URSP 2, URSP 3, URSP 4, and URSP 5.

Based on this implementation, the second URSP includes URSP 6. Optionally, the second URSP may further include a URSP in URSP 1, URSP 2, URSP 3, URSP 4, and URSP 5.

For case 4, in an implementation, step 501*a* may be, for example, that the UE sends the first information to the PCF in a registration procedure or a user policy update procedure actively initiated by the UE.

It should be noted that, in a specific implementation, the UE may further send a current URSP in the UE to the PCF, for example, may send the URSP in a PSI form. The following describes an implementation for updating the URSP in the UE by using case 3 as an example and with reference to a specific example. It should be noted that numbers 1, 2, 3, 4, and 5 in the following examples are short for URSP 1, URSP 2, URSP 3, URSP 4, and URSP 5 respectively.

In an example, the UE carries a banned list (1, 2), PSIs carried by the UE are PSI A (1, 2, 3) and PSI B (4), and the UDR stores PSI A (1, 2, 3) and PSI C (4, 5), the PCF decides that an obtained final URSP policy is (3, 4, 5). In this case, the PCF may update the URSP in the UE in a manner of PSI C (4, 5)+PSI D (3)+PSI A ( )+PSI B ( ), or directly update the URSP in the UE in a form of PSI D (3, 4, 5)+PSI A ( )+PSI B ( ). PSI A ( ) indicates deleting PSI A in the UE, and PSI B ( ) indicates deleting PSI B in the UE.

In another example, if the UE carries a banned list (4), PSIs carried by the UE are PSI A (1, 2, 3) and PSI B (4), and the UDR stores PSI A (1, 2, 3) and PSI C (4, 5), the PCF decides that an obtained final URSP policy is (1, 2, 3, 5). In this case, the PCF may update the URSP in the UE in a manner of PSI D (1, 2, 3, 5)+PSI A ( )+PSI B ( ), or update the URSP in the UE in a manner of PSI D (5)+PSI B ( ).

It should be noted that the examples are not described with reference to the banned application identifier of the UE that is stored in the UDR. For an example described with reference to the banned application identifier of the UE that is stored in the UDR, details are not described. The PCF may further update banned list information stored in the UDR.

Based on any architecture in FIG. 1, and FIG. 2A to FIG. 2D, FIG. 5B is a schematic flowchart of another communication method according to this disclosure. The method includes the following steps.

Step 501b: A PCF sends a first URSP to UE. Correspondingly, the UE may receive the first URSP.

Step 502b: The UE sends a user policy delivery report to the PCF, where the user policy delivery report includes first information, and the first information is a banned application identifier, a banned PSI, or a banned URSP identifier. Correspondingly, the PCF may receive the user policy delivery report.

Step 503b: The PCF updates, based on the first information, a banned application identifier of the UE that is stored in the UDR, where the banned application identifier is used by the PCF to perform a user policy decision, to avoid providing a URSP corresponding to the banned application identifier for the UE.

Based on this solution, after the PCF sends the URSP to the UE, the UE may include the first information in the user policy delivery report, and then the PCF updates the banned application identifier stored in the UDR based on the first information. In this way, when providing a URSP for the UE next time, the PCF may refer to a banned application identifier stored in the UDR, to avoid providing a URSP corresponding to the banned application identifier for the UE. For a specific implementation in which the PCF determines the URSP next time, refer to the method described with reference to the banned application identifier stored in the UDR in the embodiment in FIG. 5A. Details are not described herein again. This solution determines a proper URSP for the UE, and helps avoid signaling overheads caused because the UE and a PCF side continuously update and maintain a URSP that the UE does not need to use.

In step 503b, for example, that the PCF updates, based on the first information, the banned application identifier stored in the UDR may be: The PCF obtains second information from the UDR, where the second information is the banned application identifier stored in the UDR. The PCF determines third information based on the first information and the second information, where the third information includes at least one banned application identifier. The PCF stores the third information in the UDR, where the third information is used by the PCF to perform a user policy decision, to avoid providing a URSP corresponding to the third information for the UE. In an example, application identifiers determined by the PCF based on the first information include APP ID 1 and APP ID 2, and the second information stored in the UDR includes APP ID 3 and APP ID 4. In this case, the third information determined by the PCF includes APP ID 1, APP ID 2, APP ID 3, and APP ID 4, so that an updated banned application identifier stored in the UDR includes APP ID 1, APP ID 2, APP ID 3, and APP ID 4.

In an implementation, after step 502b, the PCF may further determine a URSP based on the first information, and then update a URSP stored in the UDR based on the URSP. For example, URSPs stored in the UDR include URSP 1, URSP 2, URSP 3, and URSP 4, and URSPs determined by the PCF based on the first information include URSP 1 and URSP 2. In this case, updated URSPs stored in the UDR include URSP 3 and URSP 4.

It should be noted that, in a specific implementation, the UE may further send a current URSP in the UE to the PCF, for example, may send the URSP in a PSI form. For case 4, the following describes an implementation for updating the URSP in the UE with reference to a specific example.

In an example, the UE carries an allowed list (6), PSIs carried by the UE are PSI A (1, 2, 3) and PSI B (4), and the UDR stores PSI A (1, 2, 3) and PSI C (4). The PCF decides that an obtained final URSP policy is (1, 2, 3, 4, 6). In this case, the PCF may update the URSP in the UE in a manner of PSI D (4, 6)+PSI B ( ), or directly update the URSP in the UE in a form of PSI D (1, 2, 3, 4, 6)+PSI A ( )+PSI B ( ).

Figure 5A:
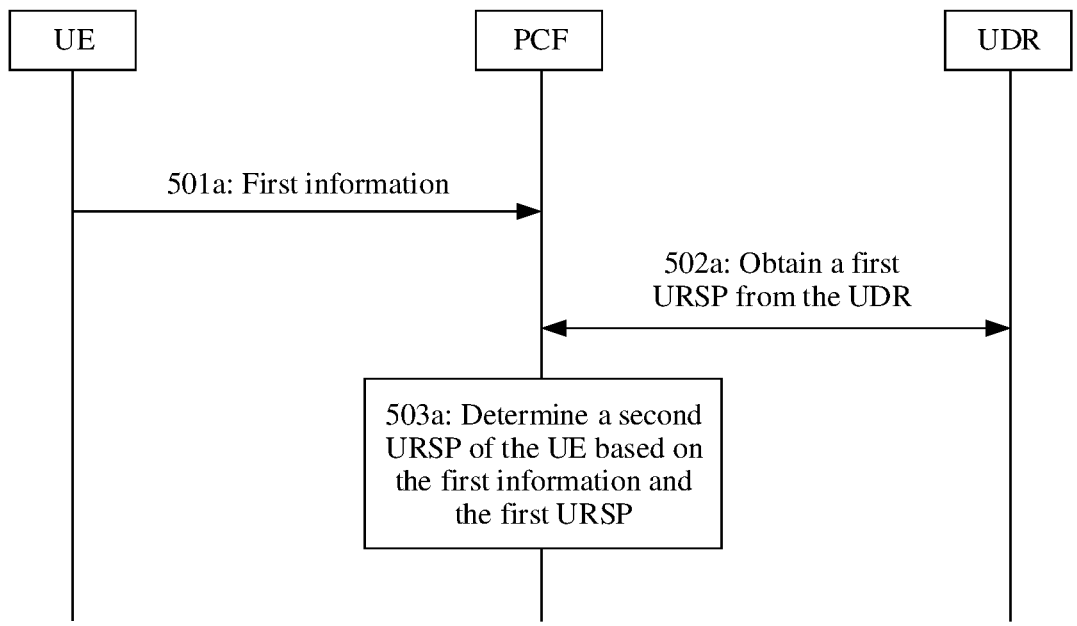
FIG. 5A is a schematic flowchart of a communication method according to this disclosure.
Figure 5B:
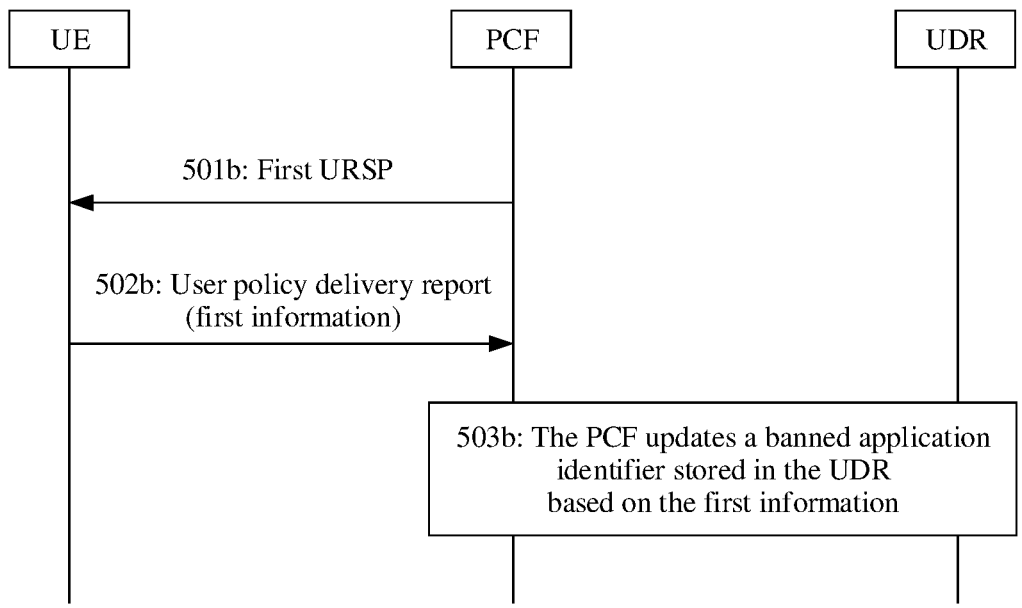
FIG. 5B is a schematic flowchart of another communication method according to this disclosure.

The following describes the procedures shown in FIG. 5A and FIG. 5B with reference to specific examples.

Figure 6:
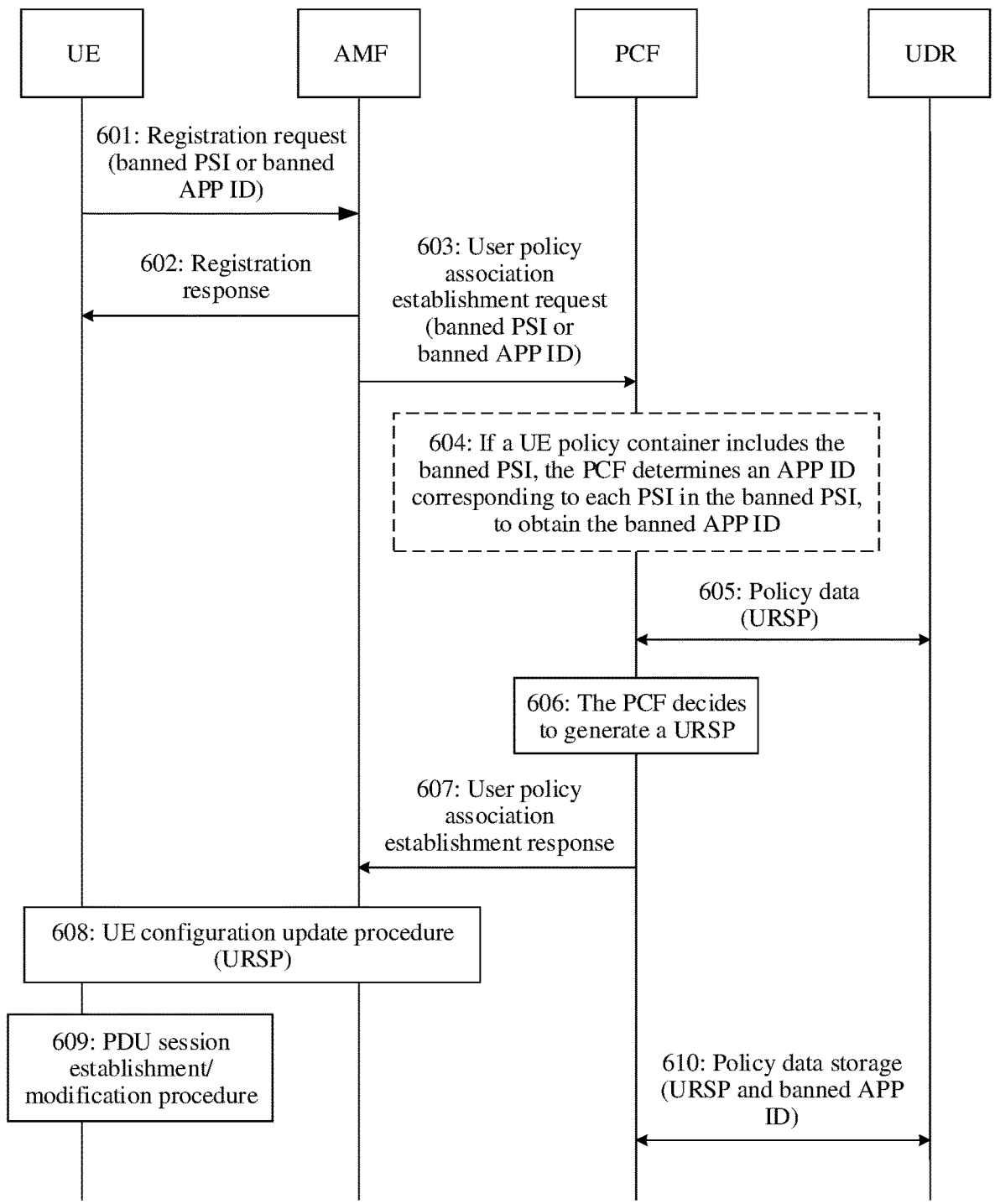
FIG. 6 is a schematic flowchart of another communication method according to this disclosure.

FIG. 6 is a schematic flowchart of another communication method according to this disclosure. This solution is a specific implementation of the method shown in FIG. 5A. This solution improves the user policy association establishment procedure shown in FIG. 4. In this solution, UE reports a banned PSI or a banned application identifier (APP ID) in a request message, to notify a PCF that the UE does not need to use the PSI or APP. Therefore, signaling overheads caused because the UE and a PCF side have to continuously update and maintain a URSP that the UE does not need to use are avoided.

For a roaming scenario, the PCF in the flowchart may be a V-PCF or an H-PCF, that is, both the V-PCF and the H-PCF may perform a URSP decision based on the banned PSI or the banned APP ID reported by the UE, and provides an updated URSP for the UE. Alternatively, the PCF in the flowchart may be the V-PCF and the H-PCF, that is, after receiving a UE policy container sent by the UE, the V-PCF may further forward the UE policy container to the H-PCF in addition to performing the actions described in the flowchart, and the H-PCF performs the actions described in the flowchart.

The method includes the following steps.

Step 601: The UE sends a registration request to an AME Correspondingly, the AMF may receive the registration request.

The registration request may be a registration request corresponding to initial registration of the UE in 5G, or may be a mobility registration request initiated when the UE is handed over from 4G to 5G. In the registration request, the UE carries a PSI list (List of stored PSIs) to notify the PCF of a locally stored user policy list, and further carries a banned PSI or a banned APP ID of the UE. One PSI corresponds to one or more URSPs.

Specifically, the registration request carries a UE policy container, where the UE policy container includes the list of stored PSIs, and includes the banned PSI or the banned APP ID. Optionally, the UE policy container further includes an OS ID, and an indication of UE support for ANDSP.

The banned PSI refers to a PSI that does not need to be used in PSIs locally stored by the UE. The banned APP ID is an identifier of an application that does not need to be used or is not installed on the UE. The APP ID herein may be in a form of traffic description information, or may be in a form of a URSP rule ID.

A manner in which the UE determines the banned PSI may be: The UE determines a part of URSPs that do not need to be used based on a previously received URSP list and with reference to an application that is locally installed or needs to be used, to obtain the banned PSI. One banned PSI corresponds to one or more banned URSPs. In an implementation, if the registration request carries the banned PSI, the banned PSI may be carried in a form of a set or a list. For example, if the banned PSI is carried in the form of a list, a banned list of PSIs is carried.

A manner in which the UE determines a banned application may be: The UE determines an application that does not need to be used or does not need to be installed with reference to an application that is locally installed or needs to be used, to obtain the banned application. In an implementation, if the banned APP ID is carried, the banned APP ID may be carried in a form of a set or a list. For example, if the banned APP ID is carried in the form of a list, a banned list of APP IDs is carried.

It should be noted that, if the banned PSI is carried in the registration request, the PSI list may be a complete PSI list, that is, a list including all PSIs locally stored by the UE. Alternatively, the PSI list may be a list including PSIs except the banned PSI in the complete PSI list. In an example, assuming that the complete PSI list locally stored by the UE includes PSI 1, PSI 2, PSI 3, PSI 4, and PSI 5, where PSI 1 and PSI 2 are banned PSIs, in an implementation, the obtained PSI list and the banned PSI carried in the UE policy container of the registration request are {PSI 1, PSI 2, PSI 3, PSI 4, and PSI 5} and {PSI 1, PSI 2} respectively. In another implementation, the obtained PSI list and the banned PSI carried in the UE policy container of the registration request are {PSI 3, PSI 4, and PSI 5} and {PSI 1, PSI 2} respectively.

Step 602: The AMF performs a registration procedure, and sends a registration response to the UE after successful registration. Correspondingly, the UE may receive the registration response.

Step 603: The AMF sends a user policy association establishment request to the PCE Correspondingly, the PCF may receive the user policy association establishment request.

The user policy association establishment request carries the UE policy container, where the UE policy container includes the PSI list, and carries the banned PSI or the banned APP ID.

Step 604: If the UE policy container includes the banned PSI, the PCF determines an APP ID corresponding to each PSI in the banned PSI, to obtain the banned APP ID.

Step 605: The PCF obtains policy data from a UDR, where the policy data includes user policy information stored in the UDR, and the user policy information includes a URSP.

Optionally, the user policy information may further include a banned APP ID or a banned PSI previously reported by the UE.

If the banned PSI previously reported by the UE is obtained from the UDR, the PCF further needs to determine a banned APP ID corresponding to the banned PSI.

Step 606: The PCF decides to generate a URSP.

Specifically, if the PCF determines that the URSP corresponding to the PSI list sent by the UE is different from the URSP obtained by the PCF from the UDR, the PCF determines that a URSP needs to be regenerated.

Methods in which the PCF regenerates the URSP include but are not limited to the following two methods:

Method 1: The PCF determines a URSP corresponding to the banned APP ID based on the banned APP ID (where the banned APP ID may be carried in step 601 or determined in step 604), and then removes the URSP corresponding to the banned APP ID from the URSP obtained from the UDR, to obtain the regenerated URSP.

Method 2: The PCF obtains a combined banned APP ID based on the banned APP ID (where the banned APP ID may be carried in step 601 or determined in step 604) and the banned APP ID obtained from the UDR, determines a URSP corresponding to the combined banned APP ID, and then removes the URSP corresponding to the banned APP ID from the URSP obtained from the UDR, to obtain the regenerated URSP.

Step 607: The PCF sends a user policy association establishment response to the AME Correspondingly, the AMF may receive the user policy association establishment response.

The user policy association establishment response may carry a trigger event list subscribed by the PCF from the AMF.

Step 607 may be performed after step 603 and before step 608.

Step 608: The PCF sends the URSP generated in step 606 to the UE in a UE configuration update procedure.

Step 609: When initiating a specific service, the UE performs a PDU session establishment/modification procedure based on the received URSP.

Step 610: After the PCF completes URSP decision or receives a user policy association release request message sent by the AMF, the PCF may send a latest locally decided URSP and the final decided banned APP ID to the UDR for storage.

Optionally, information such as the OS ID and the indication of UE support for ANDSP may be further stored in the UDR in this process.

In this embodiment, a solution in which a user side assists the PCF in performing a URSP decision is provided. The locally banned application identifier or banned PSI is provided, to avoid signaling overheads caused because the UE and the PCF side continuously update and maintain a URSP that the UE does not need to use.

Figure 7:
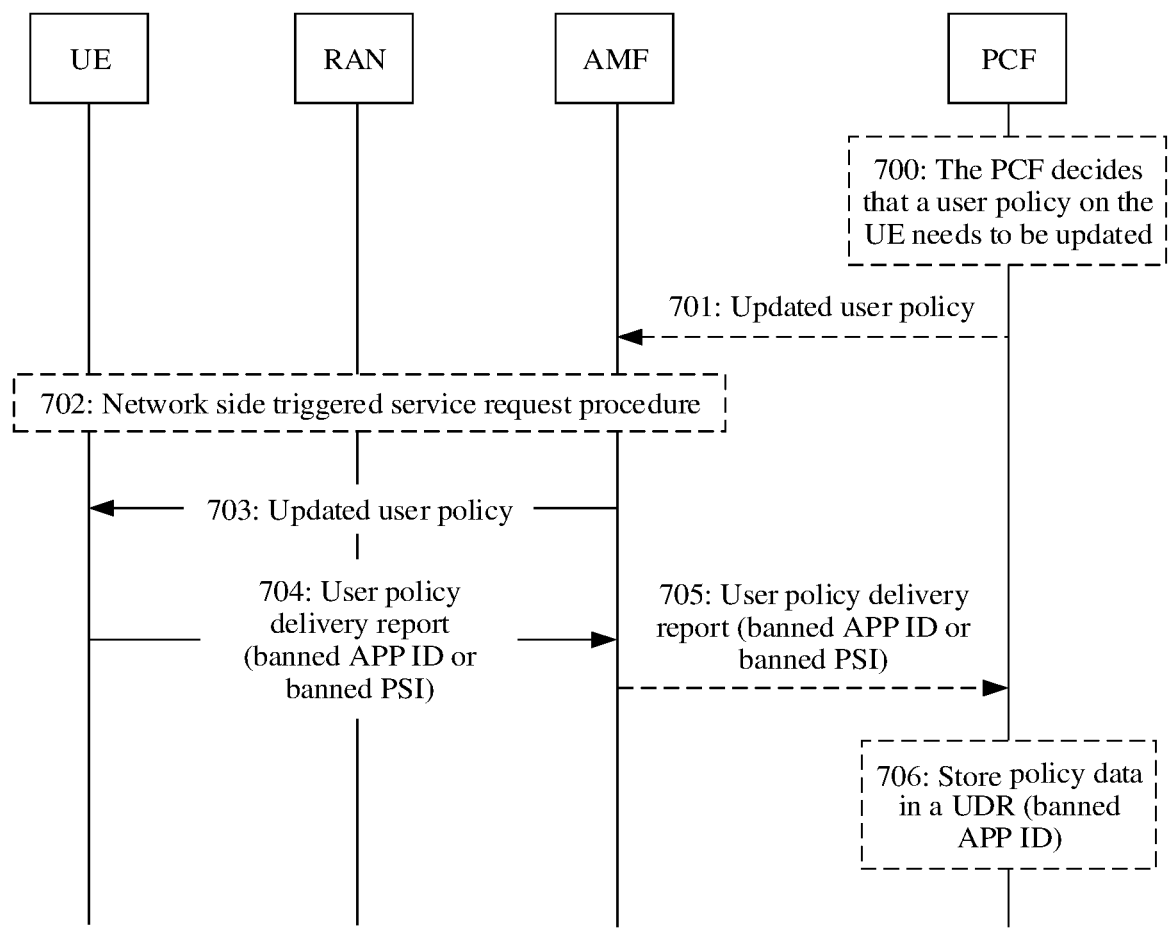
FIG. 7 is a schematic flowchart of another communication method according to this disclosure.

FIG. 7 is a schematic flowchart of another communication method according to this disclosure. This solution is a specific implementation of the embodiment shown in FIG. 5B.

This solution may be considered as a supplementary scenario of the embodiment in FIG. 6, and a difference from the embodiment in FIG. 6 lies in that, in this scenario, after receiving a URSP, UE returns a banned APP ID or a banned PSI in a user policy delivery report. The embodiment shown in FIG. 7 may be implemented in combination with the embodiment shown in FIG. 6, or may be implemented separately.

In a roaming scenario, a PCF in the flowchart corresponds to a V-PCF, in addition to performing step 706, the V-PCF further forwards the delivery report sent by the UE to an H-PCF, to trigger the H-PCF to save the banned APP ID in a UDR.

The method includes the following steps.

Step 700 to step 703 are the same as step 300 to step 303 in the embodiment in FIG. 3.

Step 704: The UE sends the user policy delivery report to an AMF. Correspondingly, the AMF may receive the user policy delivery report.

The user policy delivery report carries the banned APP ID or the banned PSI.

After receiving the URSP sent by the PCF, the UE may check the received URSP to determine whether the URSP is required. For example, the UE checks whether an application corresponding to the URSP is locally installed. If the UE determines that an application corresponding to a specific URSP is not installed or an application corresponding to a specific URSP is not required, the UE determines the application as a banned APP ID. Therefore, the UE may obtain one or more banned APP IDs based on the received URSP. Alternatively, the UE checks whether an application corresponding to the URSP is locally installed. If the UE determines that an application corresponding to a specific URSP is not installed or an application corresponding to a specific URSP is not required, the UE determines the URSP as a banned URSP. Therefore, the UE may obtain one or more banned PSIs based on the received URSP, where one PSI corresponds to one or more URSPs.

Step 705: The AMF sends the user policy delivery report to the PCF. Correspondingly, the PCF may receive the user policy delivery report.

Step 706: The PCF stores policy data in the UDR.

After receiving the user policy delivery report sent by the UE, if the report carries the banned PSI, the PCF further needs to map the banned PSI to a corresponding banned APP ID. Further, a final banned APP ID may be determined based on a banned APP obtained by the PCF from the UDR. For a specific determining method, refer to related descriptions in step 604 in the embodiment in FIG. 6.

After the PCF completes URSP decision or receives a user policy association release request message sent by the AMF, the PCF may store a latest locally decided URSP and the final banned APP ID in the UDR.

Optionally, information such as an OS ID and an indication of UE support for ANDSP may be further stored in the UDR in this process.

In this embodiment, a solution in which a user side assists the PCF in performing a URSP decision is provided. The locally banned application identifier or banned PSI is provided, to avoid signaling overheads caused because the UE and a PCF side continuously update and maintain a URSP that the UE does not need to use.

Figure 8:
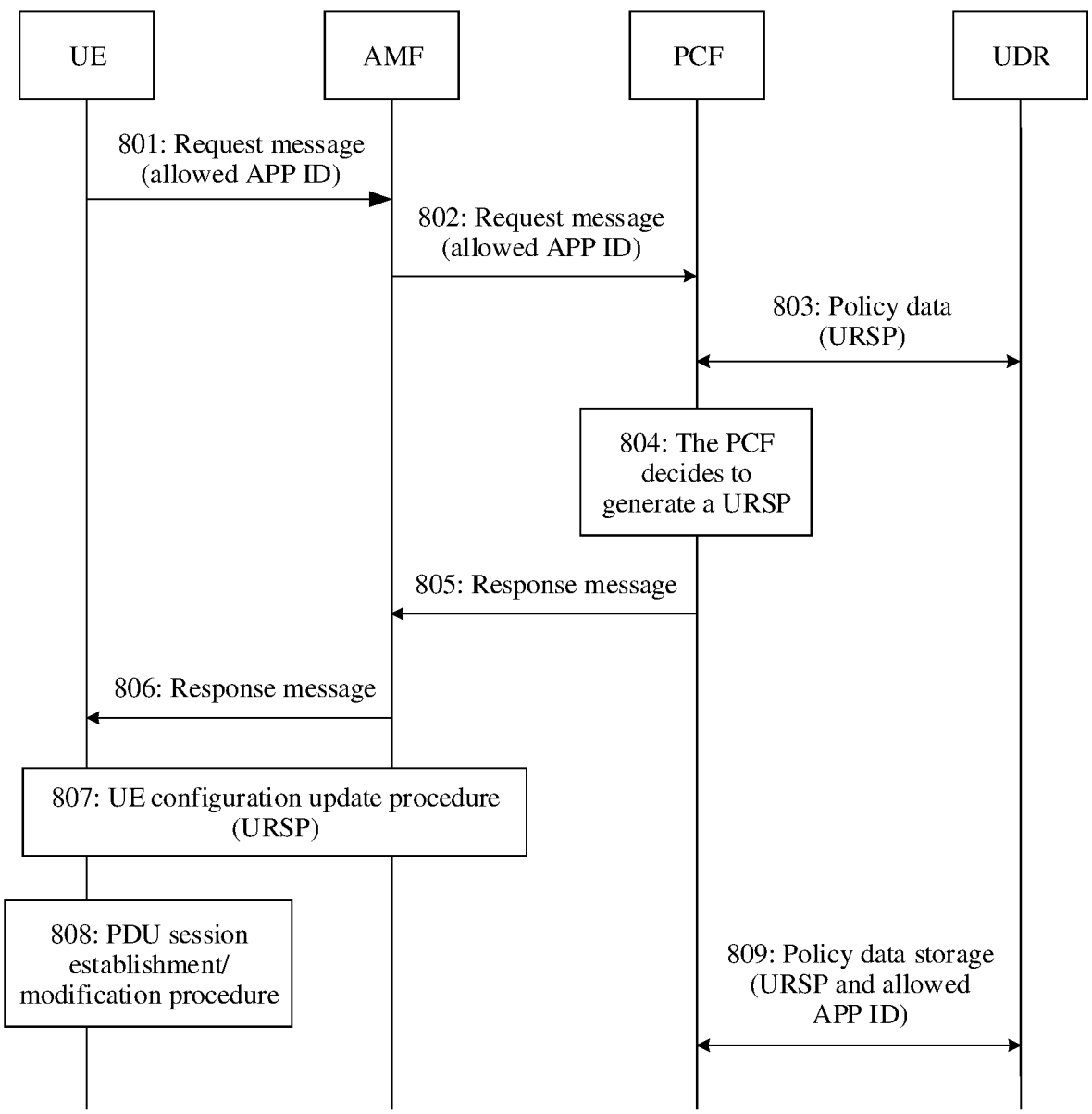
FIG. 8 is a schematic flowchart of another communication method according to this disclosure.

FIG. 8 is a schematic flowchart of another communication method according to this application. This solution is a specific implementation of case 4 shown in FIG. 5A. Compared with the embodiment in FIG. 6, a list provided by UE in this embodiment is a newly added allowed APP ID instead of a banned APP ID. In this scenario, a PCF needs to provide only a URSP corresponding to the allowed APP ID when performing a decision.

For a roaming scenario, the PCF in the flowchart may be a V-PCF or an H-PCF, that is, the V-PCF may perform a URSP decision based on the allowed APP reported by the UE, and provides an updated URSP for the UE. Alternatively, the PCF in the flowchart may be the V-PCF and the H-PCF, that is, after receiving a UE policy container sent by the UE, the V-PCF may further forward the UE policy container to the H-PCF in addition to performing the actions described in the flowchart, and the H-PCF performs the actions described in the flowchart.

The method includes the following steps.

Step 801: The UE sends a request message to an AMF. Correspondingly, the AMF may receive the request message.

In an implementation, the request message may be a registration request. For example, the registration request may be a registration request corresponding to initial registration of the UE in 5G, or may be a mobility registration request initiated when the UE is handed over from 4G to 5G. In another implementation, the request message may be a policy update request actively initiated by the UE.

In the request message, the UE carries a PSI list (List of stored PSIs) to notify the PCF of a locally stored user policy list, and further carries the newly added allowed APP ID of the UE, where an allowed APP may be a newly installed APP.

Specifically, the request message carries a UE policy container, where the UE policy container includes the list of stored PSIs, and includes the allowed APP ID. Optionally, the UE policy container further includes an OS ID, and an indication of UE support for ANDSP.

In an implementation, the allowed APP ID may be carried in a form of a set or a list. For example, if the allowed APP ID is carried in the form of a list, an allowed list of APP IDs is carried.

Step 802: The AMF sends a request message to the PCF. Correspondingly, the PCF may receive the request message.

If the request message in step 801 is the registration request, the request message in step 802 is a policy association establishment request. If the request message in step 801 is the policy update request, the request message in step 802 is a policy association update request.

The policy association establishment request carries the UE policy container, where the UE policy container includes the PSI list, and carries the allowed APP ID.

Step 803: The PCF obtains policy data from a UDR, where the policy data includes user policy information stored in the UDR, and the user policy information includes a URSP.

Optionally, the user policy information may further include an allowed APP ID previously reported by the UE.

Step 804: The PCF decides to generate a URSP.

Specifically, if the PCF determines that the URSP corresponding to the PSI list sent by the UE is different from the URSP obtained by the PCF from the UDR, the PCF determines that a URSP needs to be regenerated.

Methods in which the PCF regenerates the URSP include but are not limited to the following two methods:

Method 1: The PCF determines the URSP corresponding to the allowed APP ID in a URSP obtained from the UDR as a regenerated URSP based on the allowed APP ID (that is, carried in step 801).

Method 2: The PCF obtains a combined allowed APP ID based on the allowed APP ID (that is, the APP ID carried in step 801) and the allowed APP ID obtained from the UDR, and determines a URSP corresponding to the combined allowed APP ID in the URSP obtained from the UDR as the regenerated URSP.

Step 805: The AMF performs a registration procedure, and sends a response message to the UE after successful registration. Correspondingly, the UE may receive the response message.

If the request message in step 802 is the policy association establishment request, the response message in step 805 is a policy association establishment response. Optionally, the policy association establishment response may carry a trigger event list subscribed by the PCF from the AMF.

If the request message in step 802 is the policy association update request, the response message in step 805 is a policy association update response.

Step 806: The PCF sends a response message to the AMF. Correspondingly, the AMF may receive the response message.

If the request message in step 801 is the registration request, the response message in step 806 is a registration response. Step 806 is performed before step 802.

If the request message in step 801 is the policy update request, the response message in step 806 is a policy association update response. Optionally, the policy association update response may carry the URSP generated in step 804. For example, when the UE newly adds an allowed APP ID, if the UE provides an APP ID for a network side, after the PCF decides to obtain a URSP corresponding to the APP ID in step 804, the PCF may directly send the generated URSP to the UE in the response message in step 806.

Step 807: The PCF sends the URSP generated in step 804 to the UE in a UE configuration update procedure.

It should be noted that, if the URSP generated in step 804 has been sent to the UE in step 806, the URSP generated in step 804 does not need to be carried in step 804.

Step 808: When initiating a specific service, the UE performs a PDU session establishment/modification procedure based on the received URSP.

Step 809: After the PCF completes URSP decision, or receives a user policy association release request message sent by the AMF, the PCF may store a latest locally decided URSP and a final allowed APP ID in the UDR.

Optionally, information such as the OS ID and the indication of UE support for ANDSP may be further stored in the UDR in this process.

In this embodiment, a solution in which a user side assists the PCF in performing a URSP decision is provided. The locally newly added allowed application identifier is provided, to avoid signaling overheads caused because the UE and a PCF side continuously update and maintain a URSP that the UE does not need to use.

The foregoing mainly describes, from a perspective of interaction between network elements, solutions provided in this disclosure. It may be understood that, to implement the foregoing functions, each network element includes a corresponding hardware structure and/or software module for implementing each function. A person skilled in the art should be easily aware that with reference to the units and algorithm steps in the examples described in the embodiments disclosed in this specification, example embodiments of the present invention can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 9:
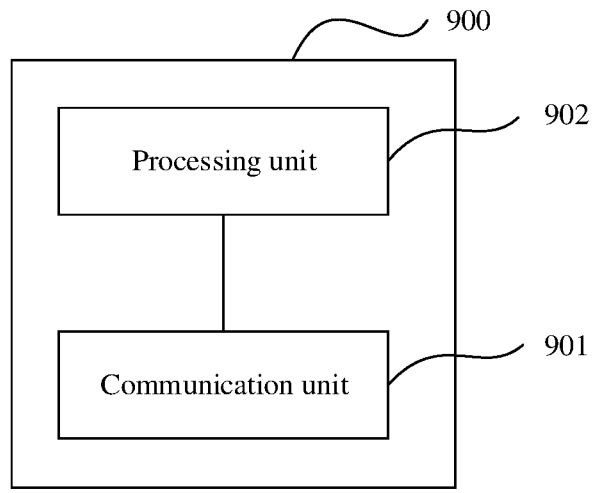
FIG. 9 is a schematic diagram of a communication apparatus according to this disclosure.

FIG. 9 is a possible example block diagram of a communication apparatus according to this disclosure. The apparatus 900 may exist in a form of software or hardware. The apparatus 900 may include a communication unit 901 and a processing unit 902. In an implementation, the communication unit 901 may include a receiving unit and a sending unit. The processing unit 902 is configured to control and manage an action of the apparatus 900. The communication unit 901 is configured to support the apparatus 900 in communicating with another network entity.

The processing unit 902 may be a processor or a controller, for example, may be a general-purpose central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in this disclosure. Alternatively, the processor may be a combination of processors implementing a computing function, for example, a combination of one or more microprocessors, or a combination of a DSP and a microprocessor. The communication unit 901 is an interface circuit of the apparatus, and is configured to receive a signal from another apparatus or send information to another apparatus. For example, when the apparatus is implemented as a chip, the communication unit 901 is an interface circuit, of the chip, that is configured to receive a signal from another chip or apparatus, and/or an interface circuit configured to send a signal to another chip or apparatus.

The apparatus 900 may be the policy control network element in the embodiments, or may be a chip used in the policy control network element. For example, when the apparatus 900 is the policy control network element, the processing unit 902 may be, for example, a processor, and the communication unit 901 may be, for example, a transmitter and/or a receiver. Optionally, the transmitter and the receiver may include a radio frequency circuit, and the storage unit may be, for example, a memory. For example, when the apparatus 900 is the chip used in the policy control network element, the processing unit 902 may be, for example, a processor, and the communication unit 901 may be, for example, an input/output interface, a pin, or a circuit. The processing unit 902 may execute computer-executable instructions stored in the storage unit. Optionally, the storage unit is a storage unit in the chip, such as a register or a cache. Alternatively, the storage unit may be a storage unit that is in the policy control network element and that is located outside the chip, for example, a read-only memory (ROM) or another type of static storage device that can store static information and instructions, or a random access memory (RAM).

The apparatus is the policy control network element in the method embodiments shown in FIG. 5A, FIG. 6, and FIG. 8.

The communication unit is configured to: receive first information from a terminal device, where the first information is a banned application identifier, a banned policy section identifier PSI, a banned URSP identifier, or an allowed application identifier; and obtain a first URSP of the terminal device from a data storage network element. The processing unit is configured to determine a second URSP of the terminal device based on the first information and the first URSP.

In a possible implementation, the communication unit is further configured to obtain second information of the terminal device from the data storage network element, where the second information is a banned application identifier of the terminal device that is stored in the data storage network element. That the processing unit is configured to determine the second URSP of the terminal device based on the first information and the first URSP specifically includes: The processing unit is configured to determine the second URSP based on the first information, the second information, and the first URSP, where the second URSP does not include a URSP corresponding to the second information and a URSP corresponding to the first information.

In a possible implementation, the first information is the banned application identifier, the banned PSI, or the banned URSP identifier. The processing unit is further configured to: determine an updated banned application identifier based on the first information and the second information; and store the updated banned application identifier in the data storage network element.

In a possible implementation, the first information is the banned application identifier or the banned PSI.

That the processing unit is configured to determine the second URSP of the terminal device based on the first information and the first URSP specifically includes: The processing unit is configured to determine the second URSP based on a third URSP and the first URSP, where the second URSP does not include the third URSP determined based on the first information.

In a possible implementation, the first information is the banned PSI. The processing unit is further configured to:

determine the banned application identifier based on the banned PSI; and determine the third URSP based on the banned application identifier.

In a possible implementation, the first information is the allowed application identifier. That the processing unit is configured to determine the second URSP of the terminal device based on the first information and the first URSP specifically includes: The processing unit is configured to determine the second URSP based on a fourth URSP and the first URSP, where the second URSP includes the fourth URSP determined based on the allowed application identifier.

In a possible implementation, the first information is the banned application identifier, the banned PSI, or the banned URSP identifier. That the communication unit is configured to receive the first information from the terminal device specifically includes: The communication unit is configured to receive the first information from the terminal device in a registration procedure of the terminal device.

In a possible implementation, the first information is the allowed application identifier. That the communication unit is configured to receive the first information from the terminal device specifically includes: The communication unit is configured to receive the first information from the terminal device in a registration procedure of the terminal device or a user policy update procedure actively initiated by the terminal device.

The apparatus may alternatively be the policy control network element in the method embodiments shown in FIG. 5B and FIG. 7.

The communication unit is configured to: send a first URSP to a terminal device; and receive a user policy delivery report from the terminal device, where the user policy delivery report includes first information, and the first information is a banned application identifier, a banned PSI, or a banned URSP identifier. The processing unit is configured to update, based on the first information, a banned application identifier stored in a data storage network element, where the banned application identifier is used by the policy control network element to perform a user policy decision, to avoid providing the terminal device with a URSP corresponding to the banned application identifier.

In a possible implementation, the processing unit is specifically configured to: obtain second information from the data storage network element through the communication unit, where the second information is the banned application identifier stored in the data storage network element; determine third information based on the first information and the second information, where the third information includes at least one banned application identifier; and store the third information in the data storage network element through the communication unit, where the third information is used by the policy control network element to perform the user policy decision, to avoid providing the terminal device with a URSP corresponding to the third information.

In a possible implementation, the processing unit is further configured to update, based on the first information, a URSP stored in the data storage network element.

If the apparatus 900 is the policy control network element, the policy control network element is presented in a form of function modules obtained through division in an integrated manner. The "module" herein may be a specific ASIC, a circuit, a processor executing one or more software or firmware programs, a memory, an integrated logic circuit, and/or another component that can provide the foregoing function. In a simple embodiment, a person skilled in the art may figure out that the policy control network element may be in a form shown in FIG. 10.

Figure 10:
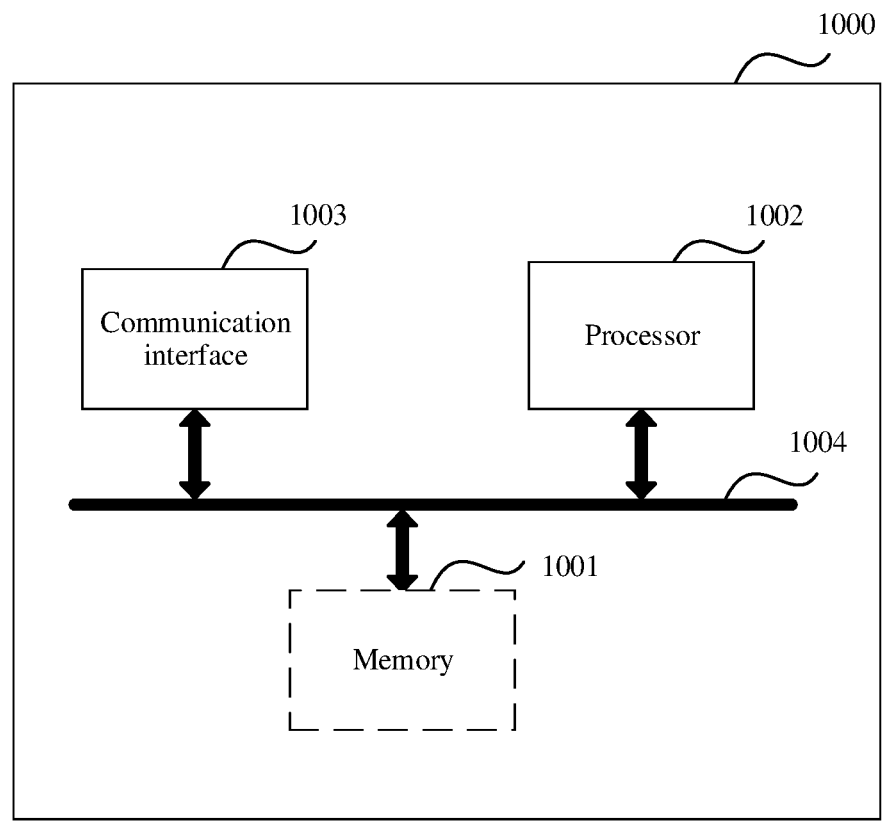
FIG. 10 is a schematic diagram of another communication apparatus according to this disclosure.

For example, a processor 1002 in FIG. 10 may invoke computer-executable instructions stored in a memory 1001, to enable the policy control network element to perform the method in the method embodiments.

Specifically, the functions/implementation processes of the communication unit 901 and the processing unit 902 in FIG. 9 may be implemented by the processor 1002 in FIG. 10 by invoking the computer-executable instructions stored in the memory 1001. Alternatively, the function/implementation process of the processing unit 902 in FIG. 9 may be implemented by the processor 1002 in FIG. 10 by invoking the computer-executable instructions stored in the memory 1001, and the function/implementation process of the communication unit 901 in FIG. 9 may be implemented through a communication interface 1003 in FIG. 10.

Optionally, when the apparatus 1000 is a chip or a circuit, the function/implementation process of the communication unit 901 may alternatively be implemented through a pin, a circuit, or the like.

FIG. 10 is a schematic diagram of another communication apparatus according to this disclosure. The apparatus may be the policy control network element in any one of the foregoing embodiments in FIG. 5A, FIG. 5B, and FIG. 6 to FIG. 8. The apparatus 1000 includes the processor 1002 and the communication interface 1003. Optionally, the apparatus 1000 may further include the memory 1001. Optionally, the apparatus 1000 may further include a communication line 1004. The communication interface 1003, the processor 1002, and the memory 1001 may be connected to each other through the communication line 1004. The communication line 1004 may be a peripheral component interconnect (PCI for short) bus, an extended industry standard architecture (EISA for short) bus, or the like. The communication line 1004 may be classified into an address bus, a data bus, a control bus, and the like. For ease of representation, only one thick line is used to represent the bus in FIG. 10, but this does not mean that there is only one bus or only one type of bus.

The processor 1002 may be a CPU, a microprocessor, an ASIC, or one or more integrated circuits configured to control program execution in the solutions of this disclosure.

The communication interface 1003 uses any apparatus like a transceiver, and is configured to communicate with another device or a communication network, such as the Ethernet, a radio access network (RAN), a wireless local area network (WLAN), or a wired access network.

The memory 1001 may be a ROM, another type of static storage device that can store static information and instructions, a RAM, or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in an instruction form or a data structure form and that can be accessed by a computer. However, the memory 1001 is not limited thereto. The memory may exist independently, and is connected to the processor through the communication line 1004. Alternatively, the memory may be integrated with the processor.

The communication interface 1003 is configured to receive code instructions and transmit the code instructions to the processor 1002, and the processor 1002 controls execution of the code instructions, to implement the communication method provided in the method embodiments of this disclosure. The code instructions may be from the memory 1001, or may be obtained from another place.

Optionally, when the apparatus 1000 is the chip, the function/implementation process of the communication interface 1003 may alternatively be implemented through a pin, a circuit, or the like. Optionally, when the apparatus 1000 is the chip, the memory may be a storage unit in the chip, for example, a register or a cache. Certainly, when the apparatus 1000 is the chip, the memory may alternatively be a storage unit located outside the chip.

Optionally, the computer-executable instructions in this embodiment of this disclosure may also be referred to as application program code. This is not specifically limited in this embodiment of this disclosure.

A person of ordinary skill in the art may understand that various numerals such as "first" and "second" in this disclosure are merely used for differentiation for ease of description, and are not used to limit the scope of the embodiments of this disclosure or represent a sequence. The term "and/or" describes an association relationship between associated objects and indicates that three relationships may exist. For example, A and/or B may indicate the following three cases: Only A exists, both A and B exist, and only B exists. The character "/" generally represents an "or" relationship between the associated objects. "At least one" means one or more. At least two means two or more. "At least one", "any one", or a similar expression means any combination of these items, including a single item (piece) or any combination of a plurality of items (pieces). For example, at least one (piece, or type) of a, b, or c may represent a, b, c, a-b, a-c, b-c, or a-b-c, where a, b, and c may be in a singular or plural form. The term "a plurality of" means two or more, and another quantifier is similar to this. In addition, an element that appears in singular forms "a", "an", and "the" does not mean "one or only one" unless otherwise specified in the context, but means "one or more". For example, "a device" means one or more such devices.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this disclosure are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (SSD)), or the like.

The various illustrative logical units and circuits described in the embodiments of this disclosure may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this disclosure may be directly embedded into hardware, a software unit executed by a processor, or a combination thereof. The software unit may be stored in a RAM, a flash memory, a ROM, an EPROM, an EEPROM, a register, a hard disk drive, a removable magnetic disk, a CD-ROM, or a storage medium of any other form in the art. For example, the storage medium may connect to a processor, so that the processor can read information from the storage medium and write information into the storage medium. Optionally, the storage medium may alternatively be integrated into the processor. The processor and the storage medium may be disposed in the ASIC.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

In one or more example designs, the functions described in this disclosure may be implemented by using hardware, software, firmware, or any combination thereof. If the functions are implemented by using software, these functions may be stored in a computer-readable medium or transmitted on a computer-readable medium in a form of one or more instructions or code. The computer-readable medium includes a computer storage medium or a communication medium that enables a computer program to move from one place to another place. The storage medium may be any available medium accessible by a general-purpose computer or a special computer. For example, such a computer-readable medium may include but is not limited to a RAM, a ROM, an EEPROM, a CD-ROM, or another optical disc storage, a disk storage or another magnetic storage apparatus, or any other medium that can be used to carry or store program code, where the program code is in an instruction form or a data structure form or in a form that can be read by a general-purpose or special computer or a general-purpose or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in the defined computer-readable medium. The disk and the disc include a compact disc, a laser disc, an optical disc, a digital versatile disc (DVD for short), a floppy disk, and a Blu-ray disc. The disc usually copies data by a magnetic means, and the disk optically copies data by a laser means. The foregoing combination may alternatively be included in the computer-readable medium.

A person skilled in the art should be aware that in one or more of the foregoing examples, the functions described in this disclosure may be implemented by using hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible by a general-purpose or dedicated computer.

The objectives, technical solutions, and beneficial effects of this disclosure are further described in detail in the foregoing specific embodiments. It should be understood that the foregoing descriptions are merely specific embodiments of this disclosure, but are not intended to limit the protection scope of this disclosure. Any modification, equivalent replacement, or improvement made based on the technical solutions of this disclosure shall fall within the protection scope of this disclosure. According to the foregoing descriptions of this specification in this disclosure, any content of technologies in the art that can be used or can be used to implement this disclosure and any modification based on the disclosed content shall be considered obvious in the art. The basic principles described in this disclosure may be applied to other variations without departing from the essence and scope of this disclosure. Therefore, the content disclosed in this disclosure is not limited to the described embodiments and designs, but may also be extended to a maximum scope that is consistent with the principles and disclosed new features of this disclosure.

Although this disclosure is described with reference to specific features and the embodiments thereof, it is clear that various modifications and combinations may be made to them without departing from the spirit and scope of this disclosure. Correspondingly, this specification and the accompanying drawings are merely example descriptions of this disclosure defined by the appended claims, and are considered as any of or all modifications, variations, combinations, or equivalents that cover the scope of this disclosure. It is clear that a person skilled in the art can make various modifications and variations to this disclosure without departing from the scope of this disclosure. This disclosure is intended to cover these modifications and variations of this disclosure provided that they fall within the scope of the claims of this disclosure and their equivalent technologies.

What is claimed is:

1. A communication method; comprising:
   receiving, by a policy control network element, first information from a terminal device, wherein the first information is a banned application identifier, or a banned policy section identifier (PSI);
   obtaining, by the policy control network element, a first user route selection policy (URSP) of the terminal device from a data storage network element; and
   determining, by the policy control network element, a second URSP of the terminal device based on the first information and the first URSP: wherein:
   the determining, by the policy control network element, of the second URSP of the terminal device based on the first information and the first URSP comprises:
   determining, by the policy control network element, the second URSP based on a third URSP and the first URSP, wherein the second URSP does not comprise the third URSP determined based on the first information.

2. The method according to claim 1, further comprising:
   sending, by the policy control network element, the first URSP to the terminal device;
   receiving, by the policy control network element, a user policy delivery report from the terminal device, wherein the user policy delivery report comprises the first information; and
   updating, by the policy control network element based on the first information, another banned application identifier stored in the data storage network element, wherein the another banned application identifier is used by the policy control network element to perform a user policy decision.

3. The method according to claim 2, wherein the updating, by the policy control network element based on the first information, another banned application identifier stored in the data storage network element comprises:
   obtaining, by the policy control network element, second information from the data storage network element, wherein the second information is the another banned application identifier stored in the data storage network element;
   determining, by the policy control network element, third information based on the first information and the second information, wherein the third information comprises at least one banned application identifier; and
   storing, by the policy control network element, the third information in the data storage network element, wherein the third information is used by the policy control network element to perform the user policy decision.

4. The method according to claim 1, wherein the method further comprises:
   storing, by the data storage network element, the first URSP; and
   sending, by the data storage network element, the first URSP to the policy control network element.

5. The method according to claim 1, wherein the first information is the banned PSI—and the method further comprises:
   determining, by the policy control network element, the banned application identifier based on the banned PSI; and
   determining, by the policy control network element, the third URSP based on the banned application identifier.

6. A communication method, comprising:
   receiving by a policy control network element, first information from a terminal device, wherein the first information is an allowed application identifier;
   obtaining, by the policy control network element, a first user route selection policy (URSP) of the terminal device from a data storage network element; and
   determining, by the policy control network element, a second URSP of the terminal device based on the first information and the first URSP; wherein:

the determining, by the policy control network element, of the second URSP of the terminal device based on the first information and the first URSP comprises:

determining, by the policy control network element, the second URSP based on another URSP and the first URSP, wherein the second URSP comprises the another URSP determined based on the allowed application identifier.

7. A communication apparatus; comprising:
at least one processor; and
a memory storing executable instructions; the processor being configured to execute the executable instructions to:
receive first information from a terminal device, wherein the first information is a banned application identifier, or a banned policy section identifier (PSI); and obtain a first user route selection policy (URSP) of the terminal device from a data storage network element; and
determine a second URSP of the terminal device based on the first information and the first URSP; wherein:
in determining the second URSP of the terminal device based on the first information and the first URSP, the processor is further configured to execute the executable instructions to: determine the second URSP based on a third URSP and the first URSP, wherein the second URSP does not comprise the third URSP determined based on the first information.

8. The communication apparatus according to claim 7, wherein the first information is the banned PSI and the processor is further configured to execute the executable instructions to:
determine the banned application identifier based on the banned PSI; and
determine the third URSP based on the banned application identifier.

9. A communication system, comprising the communication apparatus of claim 7 and a data storage network element, wherein
the data storage network element is configured to: store the first URSP, and send the first URSP to the communication apparatus.

* * * * *